United States Patent
Shimamura et al.

(10) Patent No.: US 11,065,972 B2
(45) Date of Patent: Jul. 20, 2021

(54) SADDLE TYPE ELECTRIC VEHICLE

(71) Applicant: HONDA MOTOR CO., LTD., Tokyo (JP)

(72) Inventors: Toshifumi Shimamura, Wako (JP); Takeo Numata, Wako (JP); Yoshitaka Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/647,882

(22) PCT Filed: Sep. 29, 2017

(86) PCT No.: PCT/JP2017/035422
§ 371 (c)(1),
(2) Date: Mar. 17, 2020

(87) PCT Pub. No.: WO2019/064476
PCT Pub. Date: Apr. 4, 2019

(65) Prior Publication Data
US 2020/0282850 A1    Sep. 10, 2020

(51) Int. Cl.
*B60L 53/16* (2019.01)
*B62J 43/20* (2020.01)
(Continued)

(52) U.S. Cl.
CPC .............. *B60L 53/16* (2019.02); *B62J 43/16* (2020.02); *B62J 43/20* (2020.02); *B60L 2200/12* (2013.01); *B62M 7/12* (2013.01)

(58) Field of Classification Search
CPC ........... B62J 43/16; H01R 13/62; B60L 53/16
(Continued)

(56) References Cited

U.S. PATENT DOCUMENTS 3,227,802 A * 1/1966 Pressley, Jr. ........... H02G 11/02
174/650
5,540,312 A 7/1996 Ogawa et al.
(Continued)

FOREIGN PATENT DOCUMENTS

CN 102481963 5/2012
CN 102991617 3/2013
(Continued)

OTHER PUBLICATIONS

International Search Report and Written Opinion for International Application No. PCT/JP2017/035422 dated Dec. 5, 2017, 8 pages.
(Continued)

*Primary Examiner* — Neil Abrams
(74) *Attorney, Agent, or Firm* — Amin, Turocy & Watson, LLP

(57) ABSTRACT

A saddle type electric vehicle (1) includes a charging cord (245) that is connectable to an external power supply, a cord accommodating section (230) configured to accommodate a charging cord (245), and a vehicle body cover (5) on which a cord accommodating section (230) provided, a vehicle body cover (5) includes a cover inclined surface (CS) inclined with respect to a ground plane, the cover inclined surface (CS) includes an inclined surface upper section (CS1) located on an upper section of the cover inclined surface (CS), and in the cord accommodating section (230), a cord drawing section (236) disposed in the vicinity of the inclined surface upper section (CS1) and configured to draw the charging cord (245) into the cord accommodating section (230) and an accommodating space (230s) configured to accommodate the charging cord (245) drawn from the cord drawing section (236) from the vicinity of the inclined surface upper section (CS1) to a lower section of the cord accommodating section (230) are provided.

6 Claims, 20 Drawing Sheets

(51) Int. Cl.
*B62J 43/16* (2020.01)
*B62M 7/12* (2006.01)

(58) Field of Classification Search
USPC .................................................... 439/501
See application file for complete search history.

(56) References Cited

U.S. PATENT DOCUMENTS

| | | | | |
|---|---|---|---|---|
| 5,669,471 A * | 9/1997 | Unze | ................ | H01R 13/72 191/12.2 R |
| 5,720,627 A * | 2/1998 | Gillbrand | ................ | H01R 13/72 191/12 R |
| 5,855,262 A * | 1/1999 | Jackson | ................ | B65H 75/425 191/12.4 |
| 6,312,035 B1 | 11/2001 | Aoki et al. | | |
| 6,339,861 B1 * | 1/2002 | Snyder | ................ | A47L 9/26 15/323 |
| 6,379,178 B1 * | 4/2002 | Jones, III | ................ | H01R 13/60 224/483 |
| 7,198,512 B1 * | 4/2007 | Swiatek | ................ | B62J 9/25 439/501 |
| 7,216,912 B2 * | 5/2007 | Takeshima | ................ | B62K 19/46 224/544 |
| 7,972,142 B2 * | 7/2011 | Swiatek | ................ | H01R 31/02 439/34 |
| 8,104,816 B2 * | 1/2012 | Lupton, III | ................ | H01R 13/72 296/37.1 |
| 9,425,544 B2 * | 8/2016 | Murakami | ................ | H01R 13/5208 |
| 9,463,701 B2 * | 10/2016 | Hakeem | ................ | B60L 11/1816 |
| 10,596,986 B2 * | 3/2020 | Lecointre | ................ | B62H 5/00 |
| 10,720,766 B2 * | 7/2020 | Krammer | ................ | H01B 7/0823 |
| 10,730,400 B2 * | 8/2020 | Salter | ................ | B60L 53/18 |
| 2010/0228405 A1 * | 9/2010 | Morgal | ................ | B60L 53/68 701/2 |
| 2019/0115741 A1 * | 4/2019 | Stavrinides | ................ | H01R 13/73 |
| 2020/0239097 A1 * | 7/2020 | Ichikawa | ................ | B62J 45/20 |
| 2020/0247494 A1 * | 8/2020 | Ichikawa | ................ | B60L 53/18 |
| 2020/0277016 A1 * | 9/2020 | Kobayashi | ................ | B62J 43/20 |
| 2020/0282850 A1 * | 9/2020 | Shimamura | ................ | B62J 9/12 |

FOREIGN PATENT DOCUMENTS

| | | |
|---|---|---|
| CN | 103140413 | 6/2013 |
| JP | 07-117492 | 5/1995 |
| JP | 10-007054 | 1/1998 |
| JP | 2000-203458 | 7/2000 |
| JP | 2001-114151 | 4/2001 |
| JP | 2004-352199 | 12/2004 |
| JP | 2009-161027 | 7/2009 |
| JP | 2012-171451 | 9/2012 |
| JP | 2013-233080 | 11/2013 |

OTHER PUBLICATIONS

Chinese Office Action for Chinese Patent Application No. 201780095198.8 dated Jan. 7, 2021.

* cited by examiner

SADDLE TYPE ELECTRIC VEHICLE

TECHNICAL FIELD

The present invention relates to a saddle type electric vehicle.

BACKGROUND ART

For example, Patent Document 1 discloses an electric vehicle in which a charging cord is disposed below a front section of a seat.

RELATED ART DOCUMENT

Patent Document

Patent Document 1: Japanese Unexamined Patent Application, First Publication No. 2004-352199

SUMMARY

Problems to be Solved by the Invention

Incidentally, in a saddle type electric vehicle, when a length of a charging cord is equal to or larger than a predetermined level, an accommodating space for the charging cord is required from a lower section to an upper section of the vehicle. For this reason, there is a need to accommodate the charging cord in a limited space.

An aspect of the present invention is directed to providing a saddle type electric vehicle capable of accommodating a charging cord in a limited space.

Means for Solving the Problem

An aspect of the present invention is a saddle type electric vehicle (1) including: a charging cord (245) that is connectable to an external power supply; a cord accommodating section (230) configured to accommodate the charging cord (245); and a vehicle body cover (5) on which the cord accommodating section (230) is provided, wherein the vehicle body cover (5) includes a cover inclined surface (CS) inclined with respect to a ground plane, the cover inclined surface (CS) includes an inclined surface upper section (CS1) located on an upper section of the cover inclined surface (CS), and in the cord accommodating section (230), a cord drawing section (236) disposed in the vicinity of the inclined surface upper section (CS1) and configured to draw the charging cord (245) into the cord accommodating section (230), and an accommodating space (230s) configured to accommodate the charging cord (245) drawn from the cord drawing section (236) from the vicinity of the inclined surface upper section (CS1) to a lower section of the cord accommodating section (230) are provided.

According to this configuration, since the cord drawing section disposed in the vicinity of the inclined surface upper section and configured to draw the charging cord into the cord accommodating section is provided in the cord accommodating section, it is possible to effectively use an upper area of the cord accommodating section and draw the charging cord. In addition, it is possible to effectively use a space in the vicinity of the inclined surface upper section and accommodate the charging cord. In addition, since the accommodating space configured to accommodate the charging cord drawn from the cord drawing section from the vicinity of the inclined surface upper section to the lower section of the cord accommodating section is provided in the cord accommodating section, it is possible to effectively use a lower area of the cord accommodating section and draw the charging cord. In addition, it is possible to effectively use the accommodating space and accommodate the charging cord. Accordingly, it is possible to accommodate the charging cord in a limited space.

In the aspect of the present invention, the saddle type electric vehicle further includes a lid (240) provided on the cord accommodating section (230) to be opened and closed, wherein the cover inclined surface (CS) is flush and continuous with the lid (240) when the lid (240) is in a closed state, and a hinge mechanism (250) configured to open and close the lid (240) is provided in the vicinity of the inclined surface upper section (CS1).

According to this configuration, it is possible to effectively use a space in the vicinity of the hinge mechanism and accommodate the charging cord. Accordingly, it is possible to more effectively accommodate the charging cord in a limited space.

In the aspect of the present invention, the cover inclined surface (CS) includes an inclined surface lower section (CS2) located below the inclined surface upper section (CS1), a connecting plug (246) that is connectable to an external power supply is provided on the charging cord (245), a plug fixing section (235) configured to fix the connecting plug (246) is provided on the cord accommodating section (230), the plug fixing section (235) is disposed in the vicinity of the inclined surface lower section (CS2), and a lock mechanism (255) configured to lock the lid (240) is provided in the vicinity of the inclined surface lower section (CS2).

According to this configuration, since the plug fixing section and the lock mechanism are concentrated in the vicinity of the inclined surface lower section, the lid can be smoothly locked to the lock mechanism after the connecting plug is fixed to the plug fixing section.

In the aspect of the present invention, the cord drawing section (236) is disposed above the plug fixing section (235).

According to this configuration, in comparison with the case in which the cord drawing section is disposed below the plug fixing section, the connecting plug is easily fixed to the plug fixing section after the charging cord is accommodated in the cord accommodating section. In addition, when the connecting plug is fixed to the plug fixing section, the accommodating space of the charging cord is easily fitted into a space below the cord drawing section. Accordingly, it is possible to more effectively accommodate the charging cord in a limited space.

In the aspect of the present invention, an upper end (236u) of the cord drawing section (236) is located above a lower end (243e) of the lid (240).

According to this configuration, in comparison with the case in which the upper end of the cord drawing section is disposed below the lower end of the lid, since it is easy to access the cord drawing section from the opening of the lid, the charging cord is easily drawn into the cord accommodating section.

In the aspect of the present invention, the cord accommodating section (230) includes an accommodating bottom section (234d) located on a bottom section of the cord accommodating section (230), and the accommodating bottom section (234d) is formed most deeply on a side of the inclined surface upper section (CS1).

According to this configuration, since the accommodating area is widened most deeply below the cord drawing section, the charging cord is easily drawn downward from the cord drawing section.

In the aspect of the present invention, a center tunnel (CT) bulging above a step floor (9) on which feet of an occupant are placed is provided in front of a front end of a seat (8) and below a handle (2), and the cover inclined surface (CS) is disposed on the center tunnel (CT).

According to this configuration, it is possible to effectively use an internal area of the center tunnel and accommodate the charging cord.

Advantage of the Invention

According to an aspect of the present invention, it is possible to accommodate a charging cord in a limited space.

BRIEF DESCRIPTION OF THE DRAWINGS

FIG. 18(*a*) is a view showing an accommodating state of the charging cord according to the embodiment. FIG. 18(*b*) is a view showing a first drawing out method of the charging cord according to the embodiment. FIG. 18(*c*) is a view showing a second drawing out method of the charging cord according to the embodiment.

DESCRIPTION OF THE EMBODIMENTS

Figure 1:
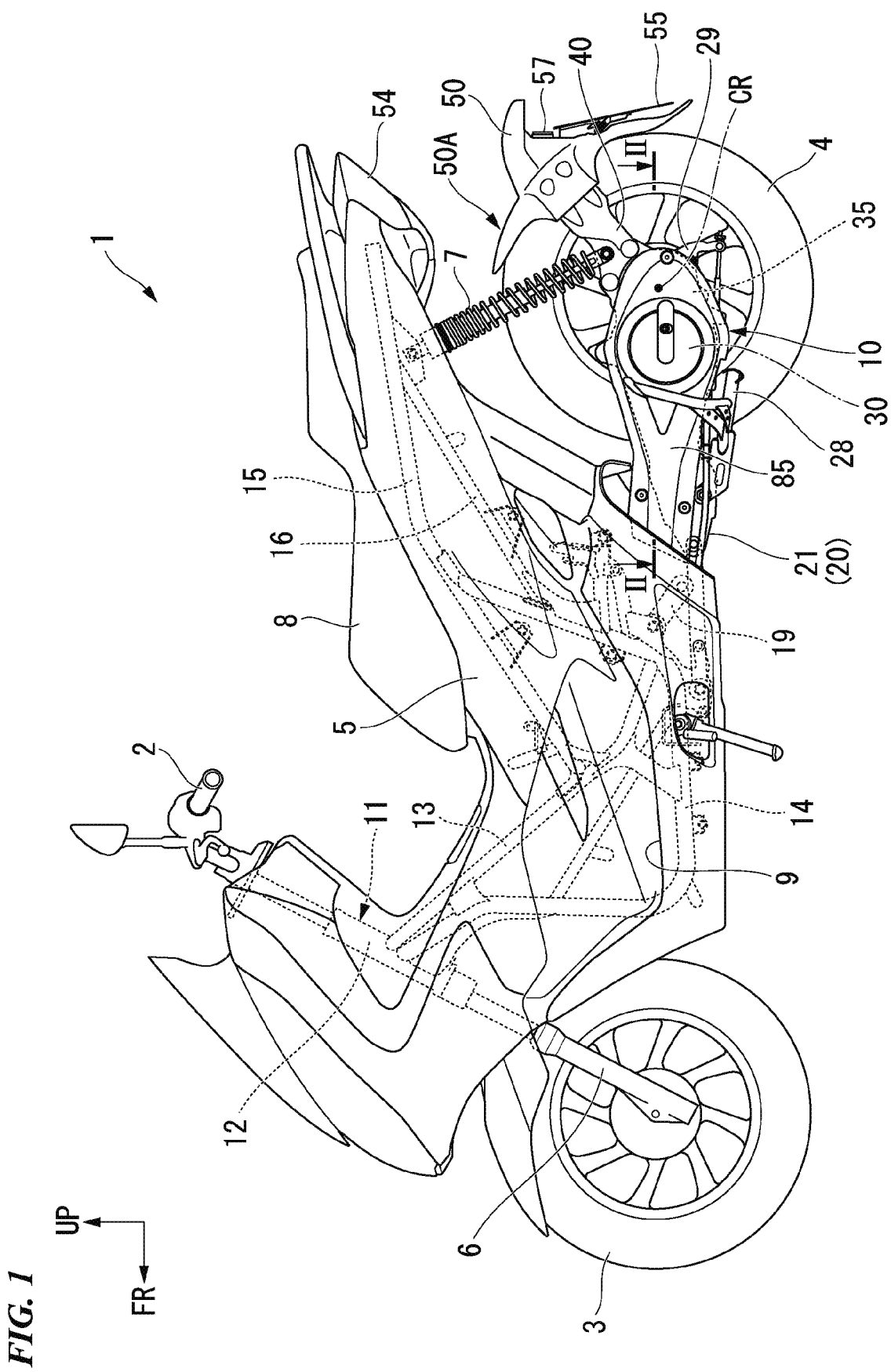
FIG. 1 is a left side view of a motorcycle according to an embodiment.

Hereinafter, an embodiment of the present invention will be described with reference to the accompanying drawings. Directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, an arrow UP indicates an upward direction with respect to the vehicle, and a line CL indicates a lateral center with respect to a vehicle body.

<Entire Vehicle>

FIG. 1 shows a unit swing type motorcycle 1 as an example of a saddle type electric vehicle. Referring to FIG. 1, the motorcycle 1 includes a front wheel 3 steered by a handle 2, and a rear wheel 4 driven by a power unit 10 including a power source. Hereinafter, the motorcycle may be simply referred to as a "vehicle." The motorcycle 1 of the embodiment is a scooter type vehicle having a step floor 9 on which an occupant who is sitting on a seat 8 puts his/her legs.

Steering system parts including the handle 2 and the front wheel 3 are steerably axially supported by a head pipe 12 of a front end of a vehicle body frame 11. An outer circumference of the vehicle body frame 11 is covered with a vehicle body cover 5. In FIG. 1, reference numeral 6 designates front forks.

The vehicle body frame 11 is formed by integrally joining a plurality of types of steel members through welding or the like. The vehicle body frame 11 includes the head pipe 12 disposed on a front end portion thereof, a pair of left and right upper frames 13 extending rearward and downward obliquely from the head pipe 12, a pair of left and right down frames 14 extending rearward and downward obliquely and more steeply than the left and right upper frames 13 from a lower section of the head pipe 12, extending rearward substantially horizontally from a lower end thereof, and then, extending rearward and upward obliquely from a rear end thereof, a pair of left and right rear upper frames 15 extending rearward and upward obliquely from vertically intermediate sections of the left and right upper frames 13, connected to rear upper ends of the left and right down frames 14 and extending rearward and upward obliquely from a connecting section thereof, and a rear lower frame 16 extending rearward and upward obliquely from rear sections of the down frames 14 and connected to rear sections of the rear upper frames 15.

<Power Unit>

The power unit 10 is a swing type power unit including a motor 30 that is a driving source disposed on a left side of the rear wheel 4, a power transmission mechanism 35 configured to drive the rear wheel 4 using power obtained from the motor 30, and a swing frame 20 configured to support the motor 30 and the power transmission mechanism 35, which are integrated with each other.

An axle 4*a* (hereinafter, referred to as a "rear wheel axle 4*a*," see FIG. 2) of the rear wheel 4 is provided on a rear end portion of the power unit 10. When power obtained from the motor 30 is transmitted to the rear wheel axle 4*a* (see FIG. 2) via the power transmission mechanism 35, the rear wheel 4 supported by the rear wheel axle 4*a* is driven and the vehicle travels. Reference character CR in the drawings designates a central axis (a rear wheel axis) of the rear wheel axle 4a that is an axis parallel to a vehicle width direction.

A front lower section of the power unit 10 is vertically swingably supported by a lower rear side of the vehicle body frame 11 with a link mechanism 19 interposed therebetween. A pair of left and right rear cushions 7 configured to attenuate rocking of the power unit 10 bridge between a rear end of the power unit 10 and a seat frame 15. Hereinafter, in the vehicle, "L" is attached to components on a left side in a vehicle width direction, and "R" is attached to components on a right side in the vehicle width direction.

<Swing Frame>

Figure 2:
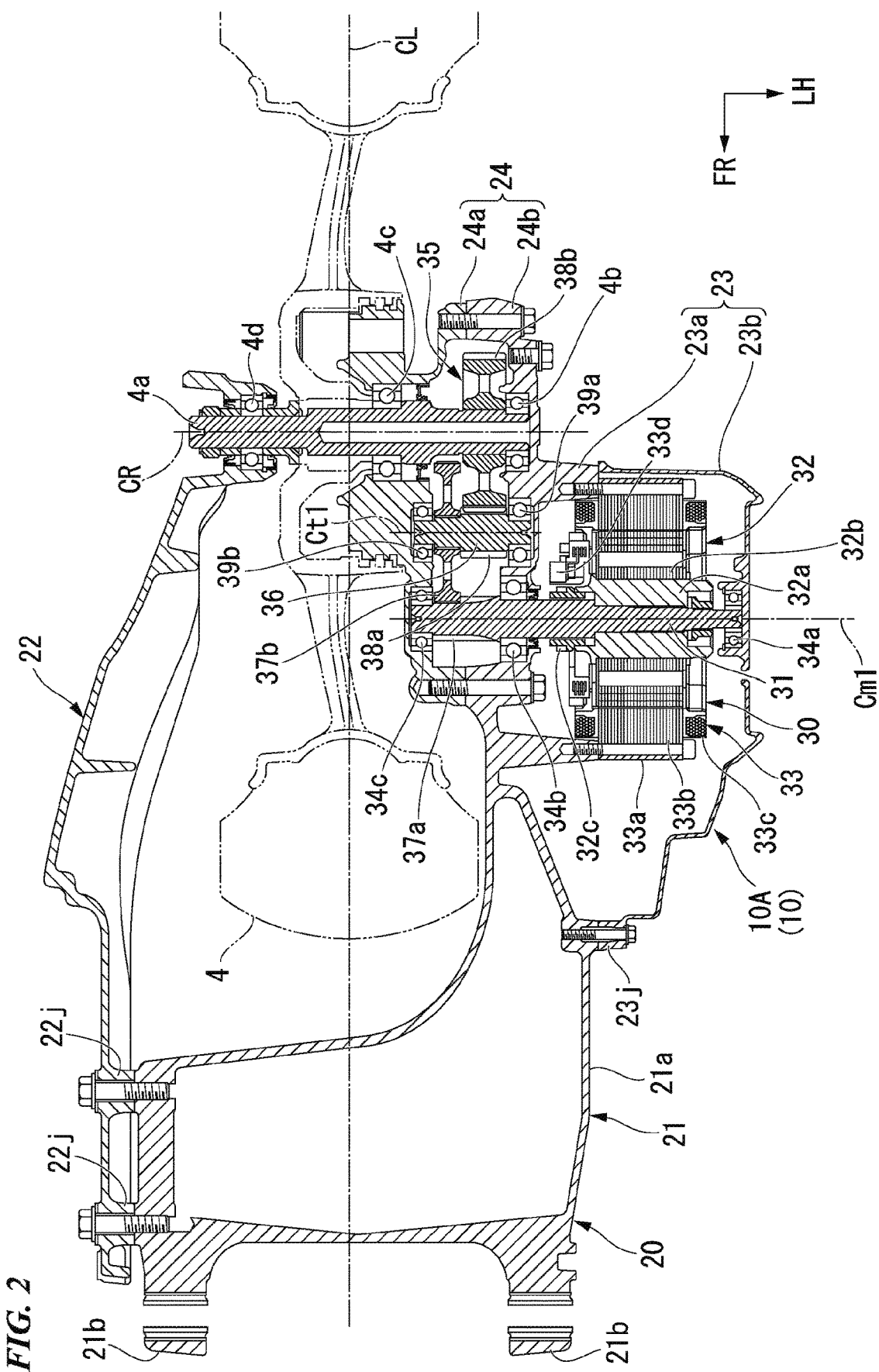
FIG. 2 is a view including a cross section along line II-II in FIG. 1.

As shown in FIG. 2, the swing frame 20 includes a main arm 21 extending forward from the rear wheel 4 toward a left side of the rear wheel 4, and a subsidiary arm 22 extending from a front right side portion of the main arm 21 toward a right side of the rear wheel 4 while being curved inward in the vehicle width direction.

<Main Arm>

A power storing section 23 configured to store the motor 30 and a transmission storing section 24 configured to store the power transmission mechanism 35 are provided in the main arm 21.

<Power Storing Section>

The power storing section 23 includes an inner cover 23a configured to cover the motor 30 from an inward side in the vehicle width direction, and an outer cover 23b configured to cover the motor 30 from an outward side in the vehicle width direction.

The inner cover 23a is formed in a box shape that opens outward in the vehicle width direction. The inner cover 23a is formed integrally with an arm section 21a of the main arm 21 as the same member.

The outer cover 23b is formed in a box shape that opens inward in the vehicle width direction. The outer cover 23b is coupled to the inner cover 23a by a fastening member such as a bolt or the like.

<Arm Section>

Figure 3:
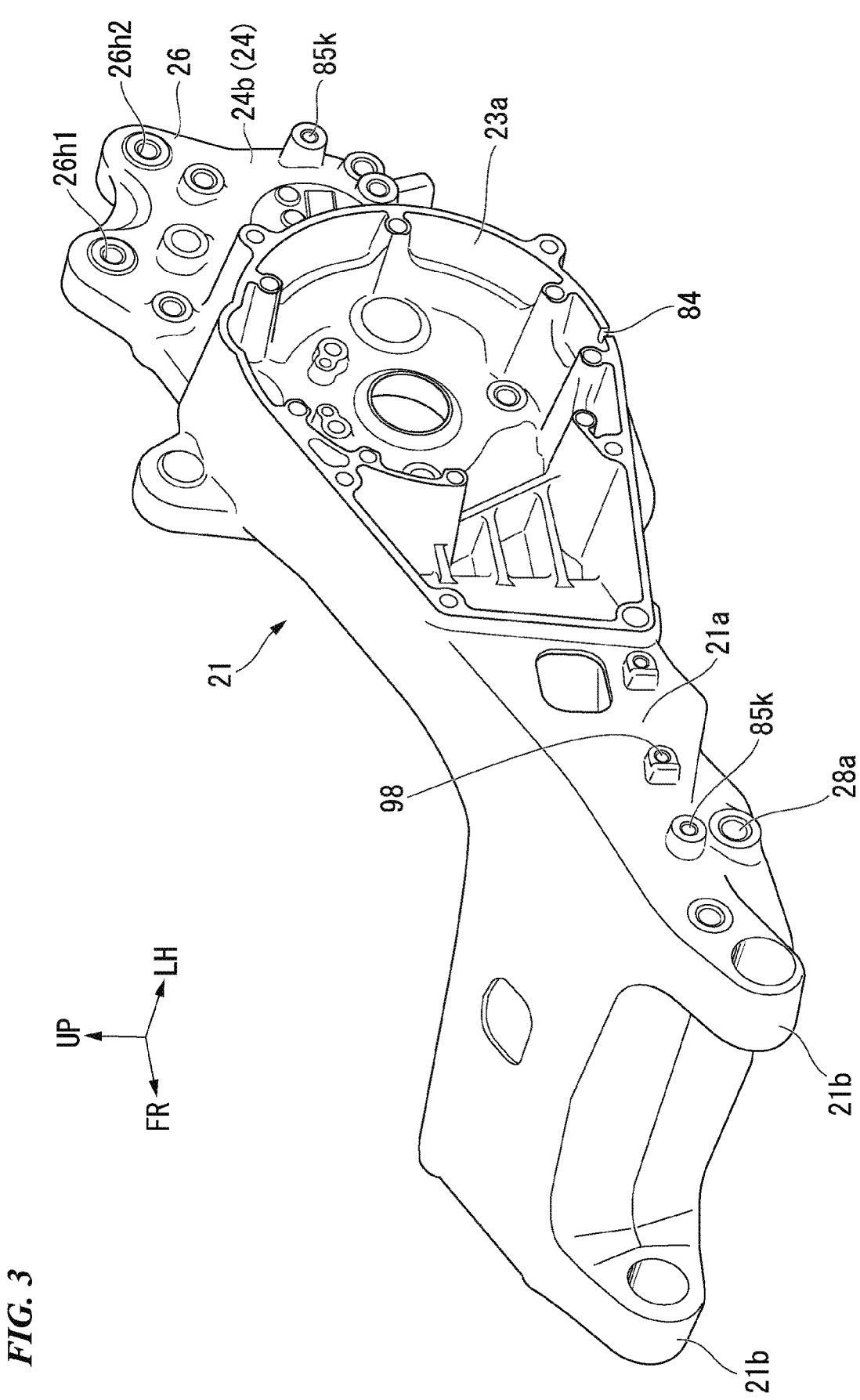
FIG. 3 is a perspective view showing a main arm according to the embodiment from above and to the left.

As shown in FIG. 2, the arm section 21a extending forward from the power storing section 23 is provided on the main arm 21. As shown in FIG. 3, the arm section 21a extends forward and rearward to be continuous with the inner cover 23a. In FIG. 3, reference numeral 21b designates a pair of left and right forward extension sections extending forward from a front end portion of the arm section 21a.

<Transmission Storing Section>

As shown in FIG. 2, the transmission storing section 24 includes an inner case 24a disposed on a left side of the rear wheel 4 inside in the vehicle width direction, and an outer case 24b configured to cover the inner case 24a from an outward side in the vehicle width direction.

The inner case 24a is formed in a box shape that opens outward in the vehicle width direction.

The outer case 24b is formed in a box shape that opens inward in the vehicle width direction. The outer case 24b is formed integrally with the same member as the inner cover 23a of the main arm 21. The outer case 24b is coupled to the inner case 24a by a fastening member such as a bolt or the like.

Figure 4:
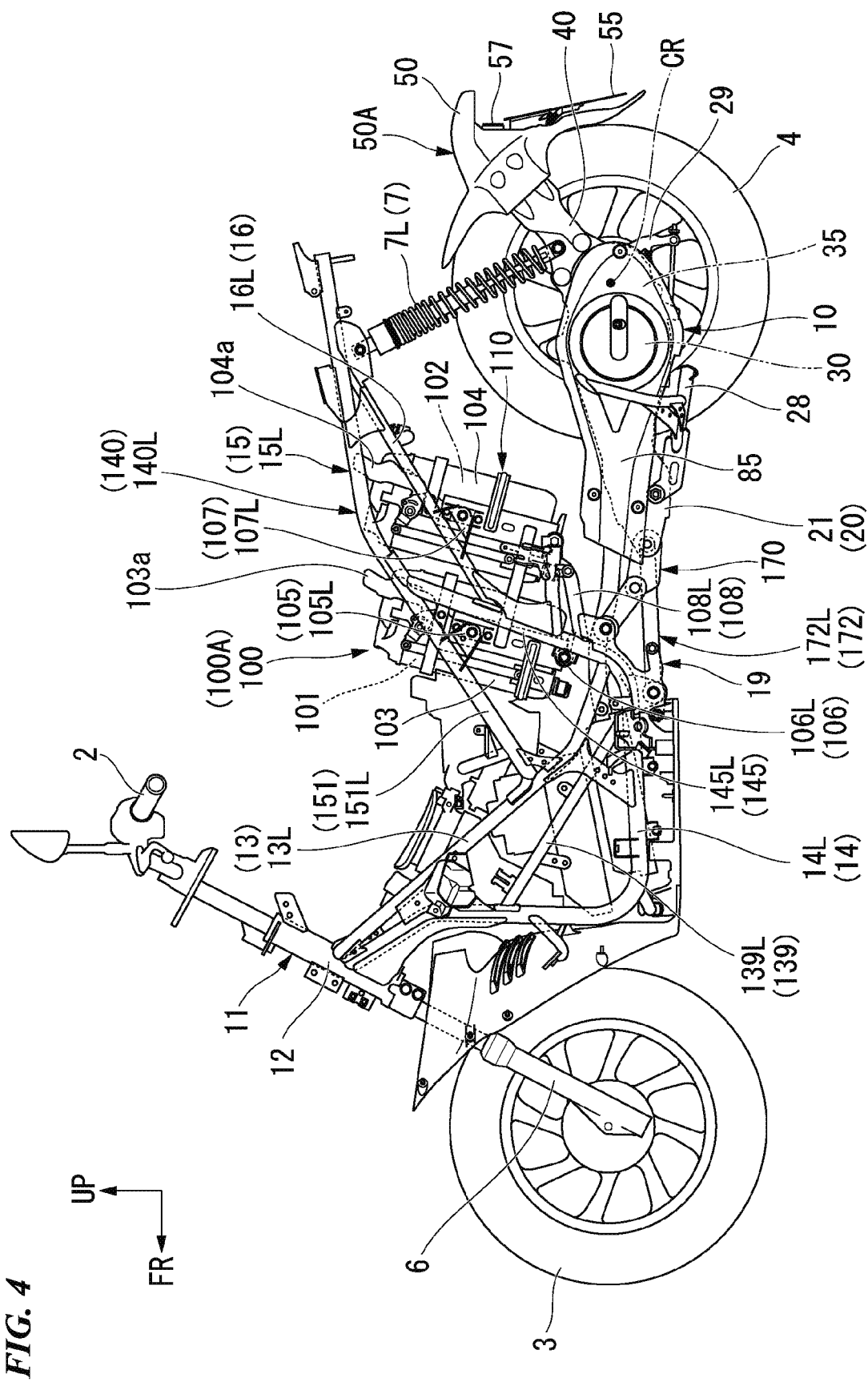
FIG. 4 is a view from which a vehicle body cover or the like in FIG. 1 is removed.

As shown in FIG. 3, a fender stay support section 26 protruding rearward and upward and configured to support a fender stay 40 (see FIG. 4) is provided on the transmission storing section 24. As shown in FIG. 4, the fender stay 40 extends rearward and upward from the vicinity of the rear wheel axle 4a (see FIG. 2) and supports a fender 50 disposed behind and above the rear wheel. In FIG. 4, reference numeral 28 designates a center stand (hereinafter, also simply referred to as a "stand"), and reference numeral 29 designates a rear brake. In FIG. 3, reference numeral 28a designates a stand engagement section with which the stand is rotatably engaged.

<Motor>

As shown in FIG. 2, the motor 30 is disposed on a left side of the rear wheel 4. The motor 30 is an electric motor. The motor 30 is an inner rotor type motor. The motor 30 includes a motor output shaft 31, an inner rotor 32 and a stator 33.

The motor output shaft 31 is directed in the vehicle width direction and axially supported by the main arm 21. The motor output shaft 31 has an axis Cm1 (hereinafter, also referred to as a "motor axis Cm1") parallel to a rear wheel axis CR. Reference numerals 34a to 34c in the drawings designate bearings configured to rotatably support the motor output shaft 31.

The inner rotor 32 includes an inner rotor main body 32a formed in a tubular shape, and magnets 32b provided on an outer circumferential surface of the inner rotor main body 32a. A central section of the inner rotor main body 32a in a radial direction is spline-coupled to the motor output shaft 31. A detection object 32c is attached to an outer circumferential surface of an inner end portion of the inner rotor main body 32a in the vehicle width direction.

The stator 33 includes an annular stator yoke 33a fixed to an outer circumferential wall of the inner cover 23a, a plurality of teeth 33b joined to the stator yoke 33a and radially provided with respect to the motor axis Cm1, and a coil 33c obtained by winding a conductive wire on the teeth 33b. A rotor sensor 33d configured to detect the detection object 32c is attached to the stator yoke 33a.

A battery 100 (see FIG. 4) is connected to the motor 30. The battery 100 supplies electric power to the motor 30 when the motor 30 drives the rear wheel 4.

<Power Transmission Mechanism>

As shown in FIG. 2, the power transmission mechanism 35 is disposed on a left side of the rear wheel 4. The power transmission mechanism 35 is provided in the transmission storing section 24 continuous with the power storing section 23.

The power transmission mechanism 35 includes a transmission shaft 36 axially supported parallel to the motor output shaft 31 and the rear wheel axle 4a, first gear pairs 37a and 37b provided on an inner end portion of the motor output shaft 31 in the vehicle width direction and an inner side portion of the transmission shaft 36 in the vehicle width direction, and second gear pairs 38a and 38b provided on an outer side portion of the transmission shaft 36 in the vehicle width direction and an left end portion of the rear wheel axle 4a. Reference numerals 4b to 4d in the drawings designate bearings configured to rotatably support the rear wheel axle 4a.

The motor output shaft 31, the transmission shaft 36 and the rear wheel axle 4a are disposed in sequence from a front side with intervals therebetween in a forward/rearward direction. The transmission shaft 36 has an axis Ct1 (hereinafter, also referred to as a "transmission axis Ct1") parallel to the motor axis Cm1. Reference numerals 39a and 39b designate bearings configured to rotatably support the transmission shaft 36.

According to this configuration, rotation of the motor output shaft 31 is decelerated by a predetermined reduction ratio, and transmitted to the rear wheel axle 4a.

<Subsidiary Arm>

As shown in FIG. 2, the subsidiary arm 22 extends forward and rearward on a right side of the rear wheel 4. A front end portion of the subsidiary arm 22 is coupled to a right side portion of a front section of the main arm 21 by a fastening member such as a bolt or the like. In FIG. 2, reference numeral 22j designates a coupling section of the subsidiary arm 22 to the main arm 21. While not shown, a right cushion support stay protruding rearward and upward and configured to support a right rear cushion is provided on a rear end portion of the subsidiary arm 22.

<Fender Structure>

As shown in FIG. 1, a fender structure 50A configured to support the fender 50 disposed behind and above the rear wheel 4 using the fender stay 40 extending from the vicinity of the rear wheel axle 4a (see FIG. 2) to a side behind the vehicle is provided on a rear side of the vehicle. The fender structure 50A has a cantilever structure in which only a left side portion of the fender 50 is fixed to the fender stay 40. In FIG. 1, reference numeral 85 designates a protective cover that covers the power storing section 23 from an outward side in the vehicle width direction, and reference numeral 54 designates a tail lamp.

In FIG. 3, reference numerals 26h1 and 26h2 designate a plurality of through-holes that open in a vehicle width direction to pass through a shaft section of a bolt, reference numeral 85k designates a coupling section of the main arm 21 or the like to a protective cover 85 (see FIG. 1), and reference numeral 98 designates a female screw section provided on the arm section 21a.

<Battery>

As shown in FIG. 4, the battery 100 configured to supply electric power to the motor 30 is mounted below the seat 8 (see FIG. 1). The battery 100 is constituted by two unit batteries 101 and 102 on front and rear sides. The unit batteries 101 and 102 have the same configuration. Each of the unit batteries 101 and 102 has a prismatic shape (a rectangular parallelepiped shape) formed in a rectangular cross-sectional shape (for example, a square shape) and extending in a longitudinal direction. The unit batteries 101 and 102 are disposed such that front and rear sides having a cross-sectional shape are in the vehicle width direction, and left and right sides are in a forward/rearward direction. The unit batteries 101 and 102 on front and rear sides are inclined parallel to each other, and disposed with an interval between front and rear surfaces.

The battery 100 generates a predetermined high voltage (for example, 48V to 72V) by serially connecting the plurality of unit batteries 101 and 102. For example, each of the unit batteries 101 and 102 is constituted by a lithium ion battery as an energy storage device that is chargeable and dischargeable. The unit batteries 101 and 102 are inserted into and removed from battery cases 103 and 104 fixed to the vehicle body (a case support structure 110) from above, respectively. As shown in FIG. 4, the case support structure 110 configured to support the battery cases 103 and 104 is attached to the vehicle body frame 11.

While not shown, battery inserting/removing ports that open upward are provided in the battery cases 103 and 104. As shown in FIG. 4, lock mechanisms 103a and 104a configured to restrict upward separation of the front and rear batteries 101 and 102 inserted into the cases are provided around the battery inserting/removing ports. The unit batteries 101 and 102 are stored in the battery cases 103 and 104 so that they can be taken in and out by sliding obliquely from the battery inserting/removing ports into the battery cases 103 and 104. When the unit batteries 101 and 102 are obliquely inserted into and removed from the battery cases 103 and 104, parts of the weights of the unit batteries 101 and 102 are supported by wall sections of the battery cases 103 and 104.

Hereinafter, below the seat 8 (see FIG. 1), the unit battery 101 disposed on a front side is referred to as "a front battery 101," and the unit battery 102 disposed on a rear side is also referred to as "a rear battery 102." Hereinafter, the battery case 103 configured to store the front battery 101 is referred to as "a front case 103," and the battery case 104 configured to store the rear battery 102 is also referred to as "a rear case 104."

Battery-side connecting terminals (not shown) are provided on lower end portions of the front and rear batteries 101 and 102. Case-side connecting terminals (not shown) configured to be detachably connected to the battery-side connecting terminals are provided on bottom wall sections of the front and rear cases 103 and 104. The case-side connecting terminals enter below bottom wall sections of the front and rear cases 103 and 104 before lock operations of the lock mechanisms 103a and 104a. Here, while insertion and removal of the front and rear batteries 101 and 102 into/from the front and rear cases 103 and 104 are possible, the battery-side connecting terminal and the case-side connecting terminal cannot be connected by simply inserting the front and rear batteries 101 and 102 into the front and rear cases 103 and 104.

After the front and rear batteries 101 and 102 are accommodated in the front and rear cases 103 and 104, the case-side connecting terminals protrude above the bottom wall sections of the front and rear cases 103 and 104 by locking the lock mechanisms 103a and 104a. Accordingly, the battery-side connecting terminal and the case-side connecting terminal are connected to each other. The locking operation and terminal connection can be performed at each of the front and rear batteries 101 and 102.

Operations of the lock mechanisms 103a and 104a and insertion and removal of the front and rear batteries 101 and 102 are manual, and the front and rear batteries 101 and 102 are attached to and detached from the vehicle body without a tool. The front and rear batteries 101 and 102 can be attached to and detached from the vehicle body in an open state of the seat 8 (see FIG. 1). The front and rear batteries 101 and 102 cannot be attached to and detached from the vehicle body in a closed state of the seat 8 (see FIG. 1). The front and rear batteries 101 and 102 can be switched between the detachable state and the non-detachable state with respect to the vehicle body according to the opening and closing of the seat 8 (see FIG. 1).

The front and rear batteries 101 and 102 are mobile batteries detachable from the vehicle body. The front and rear batteries 101 and 102 may be charged by a charger outside the vehicle, or may be used as a power supply of an external device as a mobile battery. The front and rear batteries 101 and 102 may be used individually.

Figure 5:
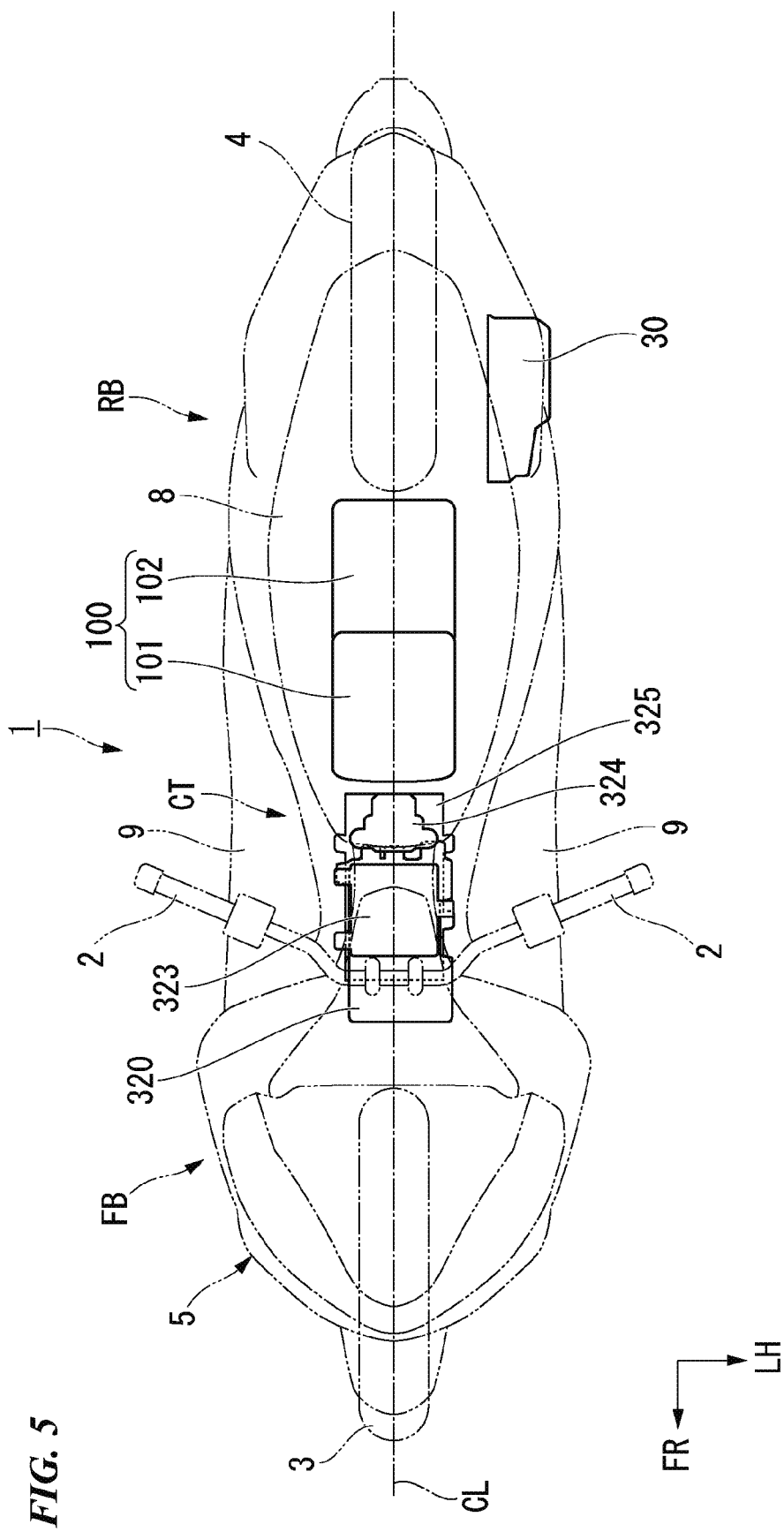
FIG. 5 is a plan view showing component arrangement in a vehicle body according to the embodiment.

As shown in FIG. 5, the battery 100 is disposed in front of the motor 30 in the vehicle forward/rearward direction. When seen in a plan view of FIG. 5, the battery 100 is disposed at a position that avoids the motor 30. When seen in a plan view of FIG. 5, the front and rear batteries 101 and 102 are disposed to laterally cross a lateral centerline CL of the vehicle body. When seen in a plan view of FIG. 5, centers of the front and rear batteries 101 and 102 in the vehicle width direction coincide with the lateral centerline CL of the vehicle body.

<Center Tunnel or the Like>

As shown in FIG. 5, the motorcycle 1 includes the pair of left and right step floors 9 on which feet of a driver who is sitting on the seat 8 are placed, a center tunnel CT extending in the vehicle forward/rearward direction between the left and right step floors 9, a front body FB continuous with front sides of the center tunnel CT and the left and right step floors 9, and a rear body RB continuous with rear sides of the center tunnel CT and the left and right step floors 9.

Figure 6:
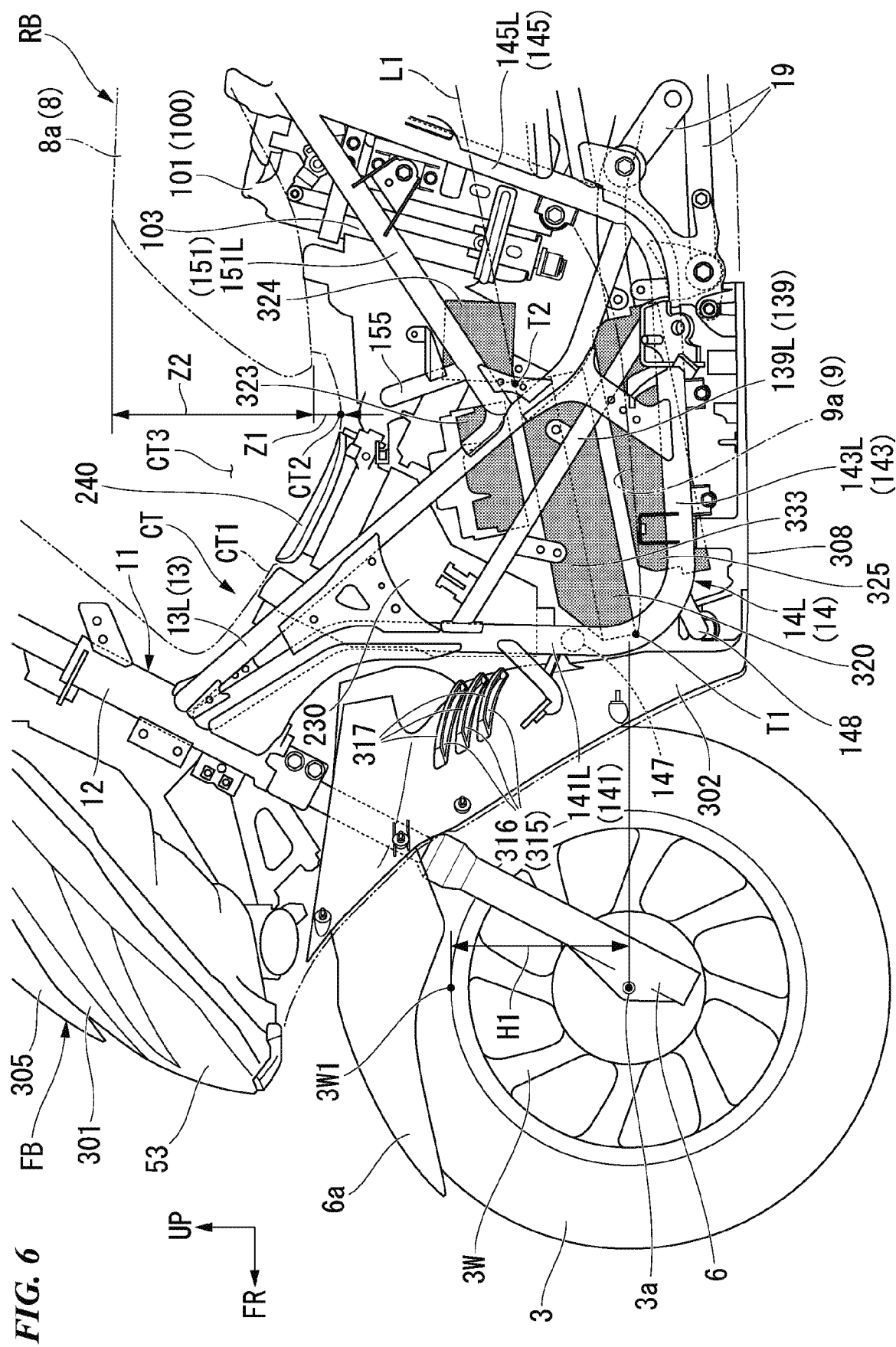
FIG. 6 is a left side view showing component arrangement in a center tunnel according to the embodiment.

The center tunnel CT is provided in front of a front end of the seat 8 and below the handle 2. The center tunnel CT bulges above the step floor 9. As shown in FIG. 6, in the center tunnel CT, an upper surface section CT1 extends to be inclined rearward and downward behind the front body FB. The center tunnel CT is connected to the rear body RB by a rear side of the upper surface section CT1 being curved upward. Hereinafter, a curved lower end portion of the center tunnel CT behind the upper surface section CT1 is referred to as the lowermost section CT2.

The lowermost section CT2 is disposed above an upper end of the front wheel 3. The lowermost section CT2 is disposed in the vicinity of the lower end portion of the seat 8 (a front seat 8a). When seen in a side view, a distance z1 in the upward/downward direction between the lowermost section CT2 and a lower end portion of the front seat 8a is smaller than a thickness z2 of the front seat 8a in the upward/downward direction. A distance from a floor surface 9a to the lowermost section CT2 is larger than a distance from the lowermost section CT2 to an upper surface of the front seat 8a.

In the motorcycle 1, the center tunnel CT can be sandwiched between left and right legs of an occupant while maintaining a degree of freedom at a position where the legs of the occupant are placed by providing the center tunnel CT on the step floors 9. For this reason, comfort around the legs of the occupant and controllability of the vehicle body are secured. The center tunnel CT constitutes a bottom floor section of the motorcycle 1. A straddling space CT3 that allows the occupant to easily straddle the vehicle body is formed above the center tunnel CT.

A lower side of the front end portion of the seat 8 is connected to a vehicle body with a hinge shaft in the vehicle width direction (the leftward/rightward direction) interposed therebetween. The seat 8 opens and closes an upper section of the rear body RB by being vertically pivoted about the hinge shaft. When the seat 8 is in the closed state (see FIG. 1) in which the upper section of the rear body RB is closed, the occupant can sit on the seat 8. When the seat 8 is in the open state in which the upper section of the rear body RB is open, the occupant can access articles or a space below the seat 8. The seat 8 can be locked in the closed state.

In FIG. 6, reference numeral 6a designates a front fender, reference numeral 53 designates a front combination lamp, reference numeral 301 designates a front cover configured to cover the upper section of the front body FB above the front combination lamp 53 from a forward side, reference numeral 302 designates a front lower cover having a concave shape and configured to cover the lower section of the front body FB from a forward side below the front combination lamp 53 and behind the front wheel 3, reference numeral 305 designates a window screen attached to the upper section of the front cover 301 to overlap the upper section from a forward side, and reference numeral 308 designates an undercover configured to cover a lower surface of the vehicle body from below.

An air guide hole 315 configured to guide traveling air into the center tunnel CT is provided in the front lower cover 302. The air guide hole 315 has a plurality of openings 316. A hood 317 configured to turn traveling air passing through the openings 316 downward is provided on a side of a back surface (a side of a rear surface) of the front lower cover 302.

In FIG. 6, reference numeral 320 designates a power control unit (PCU) that is a control unit (a control part), reference numeral 323 designates a junction box, reference numeral 324 designates a contactor, reference numeral 325 designates a charger, and reference numeral 333 designates a radiating fan.

When seen in a side view of FIG. 6, the PCU 320 is disposed in a height range H1 between an axial center of a front wheel axle 3a and an upper end 3w1 of a wheel 3w in the upward/downward direction. The PCU 320 is disposed to be inclined forward and downward when seen in a side view. The front lower end (the lowermost end) T1 of the PCU 320 is disposed at substantially the same height as the front wheel axle 3a. The rear upper end (the uppermost end) T2 of the PCU 320 is disposed below the upper end 3w1 of the wheel 3w of the front wheel 3.

When seen in a side view of FIG. 6, an extension line L1 extending from an upper edge of a radiating fan 333 toward a rear side of the vehicle overlaps the battery 100.

<Details of Vehicle Body Frame>

Figure 7:
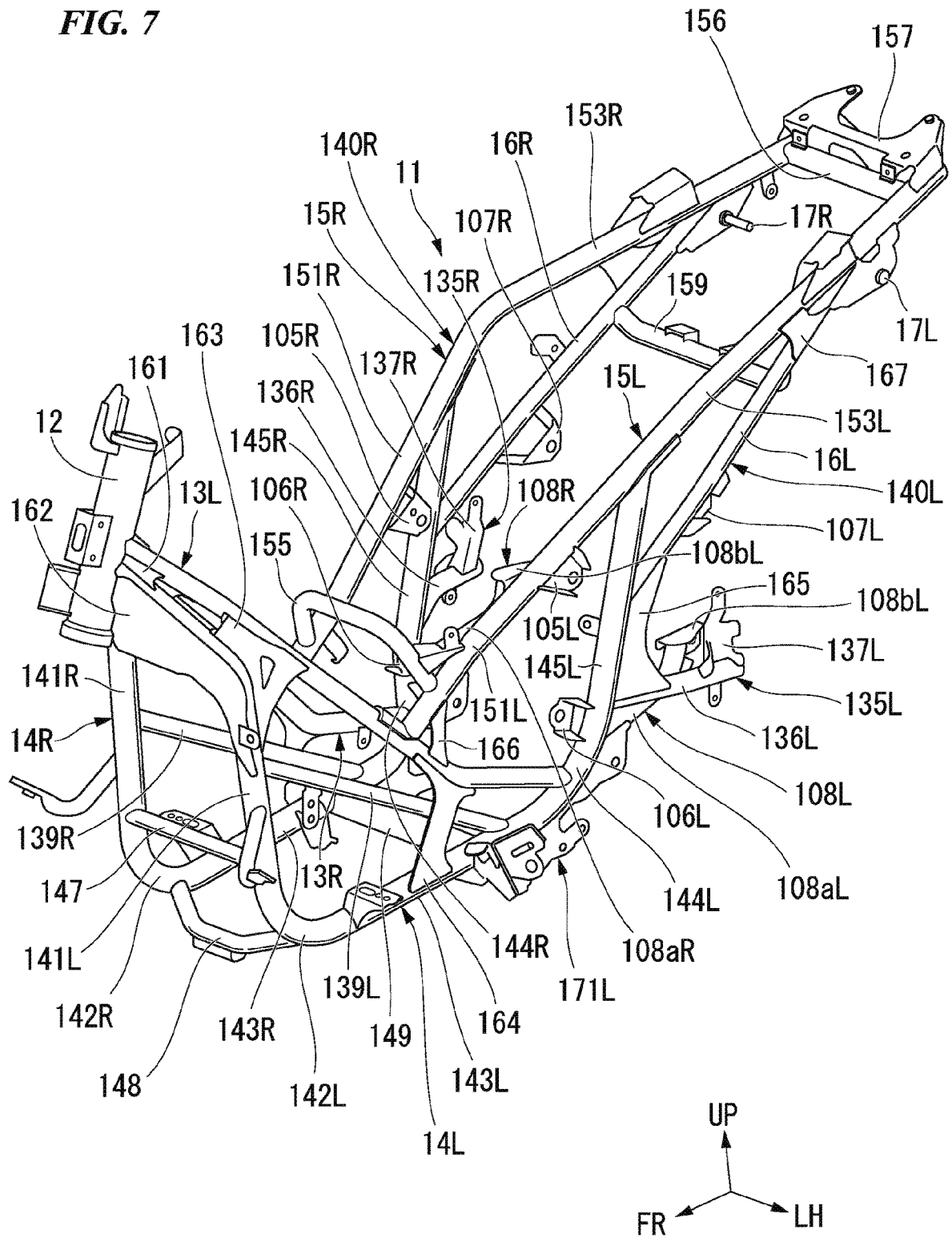
FIG. 7 is a perspective view showing a vehicle body frame according to the embodiment from above and to the left.

As shown in FIG. 7, the vehicle body frame 11 includes the head pipe 12 located at a front end portion and extending upward and downward, the pair of left and right upper frames 13L and 13R extending rearward and downward from a vertically intermediate section of the head pipe 12, the pair of left and right down frames 14L and 14R extending rearward after extending downward from a lower section of the head pipe 12, and then, extending rearward and upward, a pair of left and right middle frames 139L and 139R extending to be inclined to be disposed downward as they go rearward between above and below of the left and right upper frames 13L and 13R and the left and right down frames 14L and 14R, the pair of left and right rear upper frames 15L and 15R (second rear frames) extending rearward and upward from longitudinal intermediate sections of the left and right upper frames 13L and 13R, and the pair of left and right rear lower frames 16L and 16R (third rear frames) extending to be inclined to be located further upward as they go further rearward below the left and right rear upper frames 15L and 15R.

For example, elements of the vehicle body frame 11 are constituted by round steel pipes. "Intermediate" used in the embodiment means not only a center between both ends of an object but also a range between both ends of the object. The down frames 14 and the rear upper frames 15 are constituted by round steel pipes having substantially the same diameter. The upper frames 13, the middle frames 139 and the rear lower frame 16 are constituted by round steel pipes having a slightly smaller diameter than that of the down frames 14 (the rear upper frames 15).

In FIG. 7, reference numeral 17L designates a left cushion upper shaft support section that rotatably and axially supports an upper end portion of a left rear cushion 7L (see FIG. 4), and reference numeral 18R designates a right cushion upper shaft support section that rotatably axially supports an upper end portion of a right rear cushion (not shown).

<Head Pipe>

Figure 8:
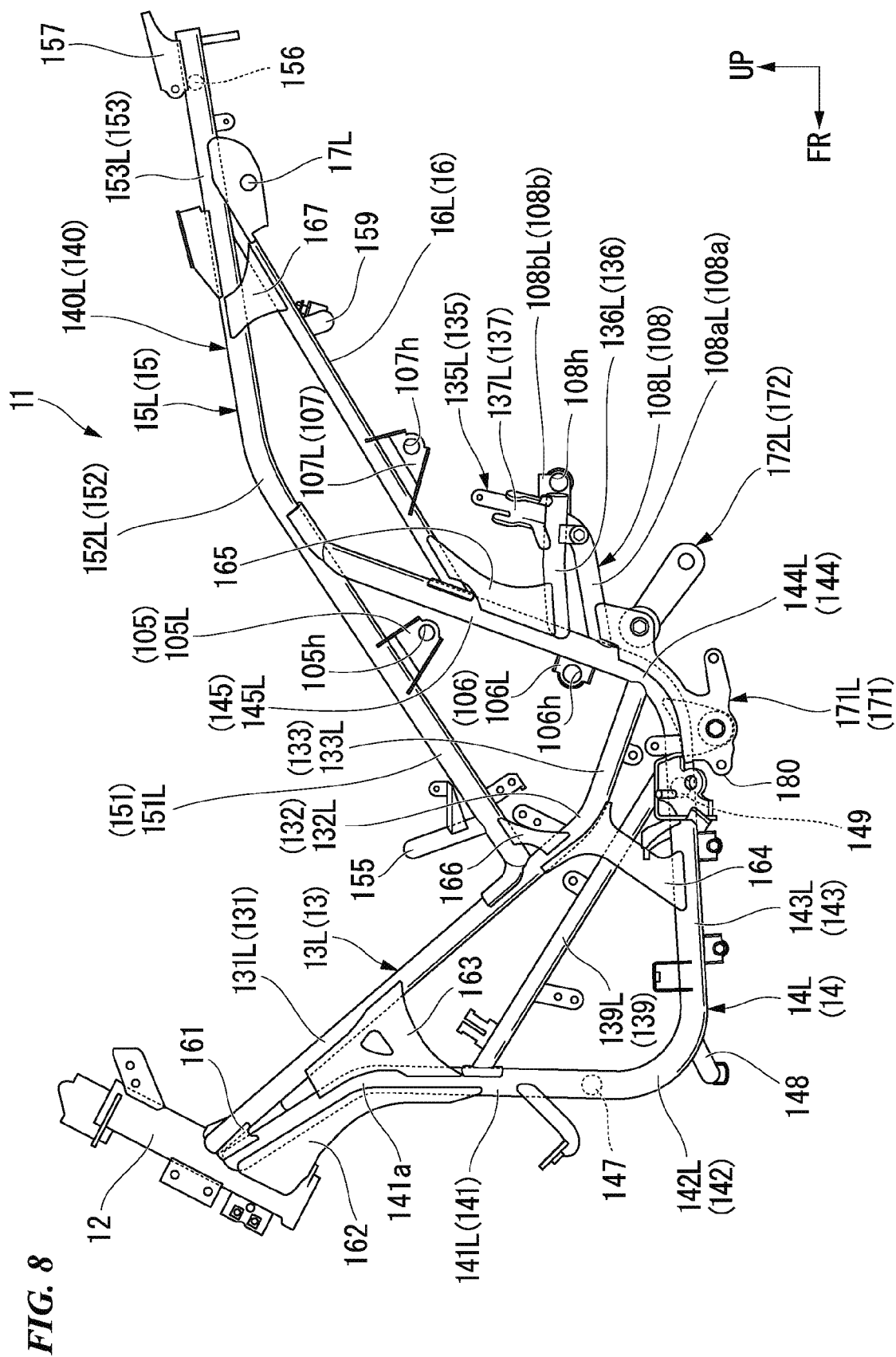
FIG. 8 is a left side view of the vehicle body frame according to the embodiment.

When seen in a side view of FIG. 8, the head pipe 12 extends to be inclined to be located further rearward as it goes further upward. Various brackets configured to attach components of the vehicle front section are provided on the head pipe 12.

<Upper Frame>

When seen in a side view of FIG. 8, the upper frame 13 includes an upper frame front half section 131 linearly extending rearward and downward from a vertically intermediate section of the head pipe 12, a front lower curved section 132 continuous with a lower end of the upper frame front half section 131 and formed in a curved shape protruding forward and downward, and an upper frame rear half section 133 continuous with a rear end of the front lower curved section 132 and extending linearly rearward and downward to be inclined more gently than the upper frame front half section 131. The upper frame front half section 131, the front lower curved section 132 and the upper frame rear half section 133 are constituted by an integrated round steel pipe. A rear lower end of the upper frame rear half section 133 is connected to a rear lower bent section 144 of the down frame 14 from above and in front.

Figure 9:
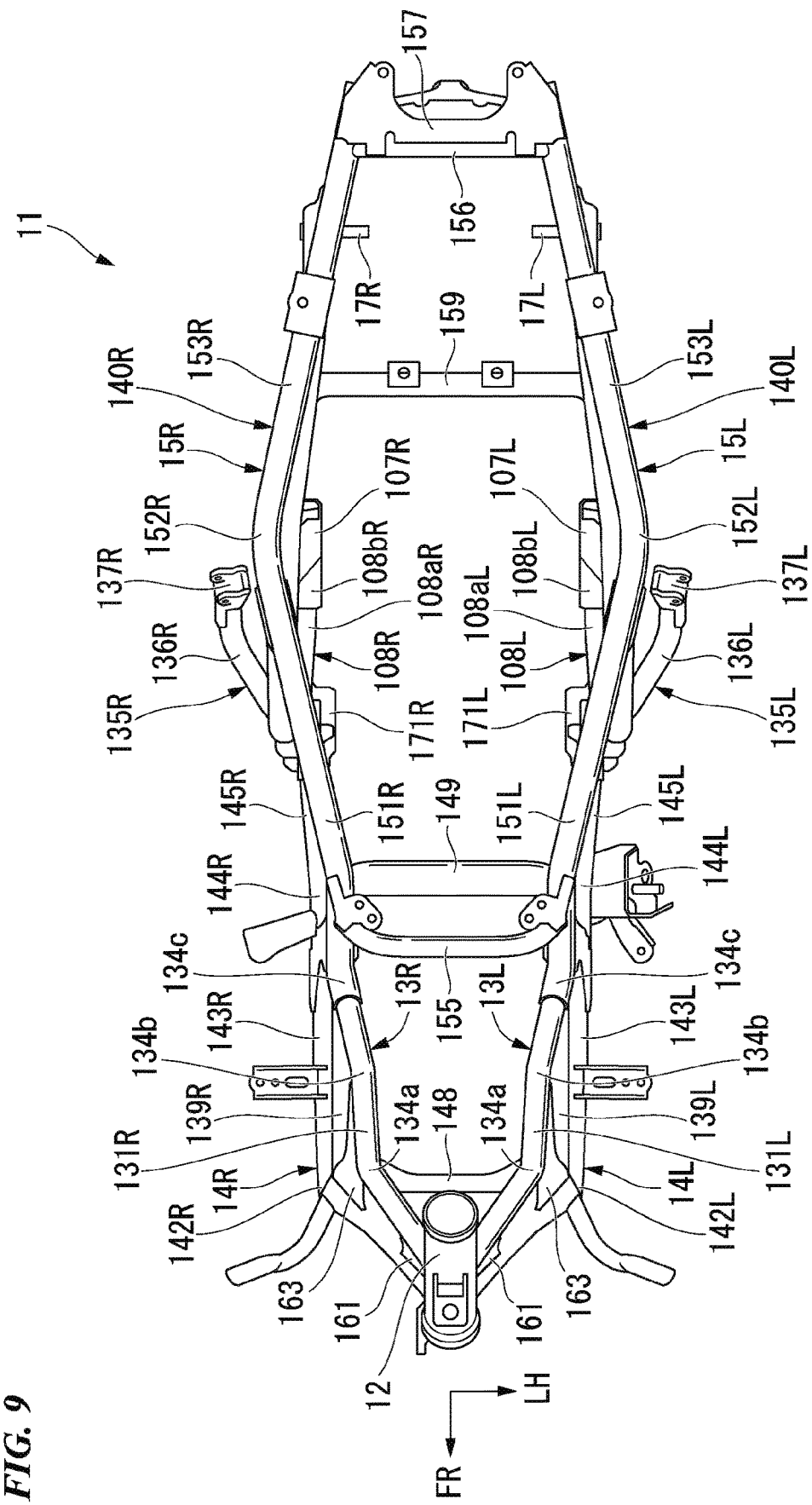
FIG. 9 is a plan view of the vehicle body frame according to the embodiment.

When seen in a plan view of FIG. 9, the left and right upper frames 13L and 13R are disposed on a side further inward than the left and right down frames 14L and 14R in the vehicle width direction. When seen in a plan view of FIG. 9, the left and right upper frames 13L and 13R extend to be inclined while being curved at a plurality of places to be disposed outward in the vehicle width direction as they go rearward from the vertically intermediate section of the head pipe 12.

When seen in a plan view of FIG. 9, the left and right upper frames 13L and 13R are inclined to be located further outward in the vehicle width direction as they go further rearward from the vertically intermediate section of the head pipe 12, and then, curved at a first bent section 134a and extend substantially parallel to a side surface of the vehicle body. When seen in a plan view of FIG. 9, the left and right upper frames 13L and 13R are bent at the first bent section 134a and extend substantially parallel to the side surface of the vehicle body, and then, bent at a second bent section 134b and extend to be inclined to be located further outward in the vehicle width direction as they go further rearward. When seen in a plan view of FIG. 9, the left and right upper frames 13L and 13R are bent at the second bent section 134b and extend to be inclined to be located further outward in the vehicle width direction as they go further rearward, and then, bent at a third bent section 134c and extend substantially parallel to the side surface of the vehicle body.

<Down Frame>

When seen in a side view of FIG. 8, the down frame 14 is formed in a U shape. When seen in a side view of FIG. 8, the down frame 14 includes a front down frame section 141 extending downward from a lower section of the head pipe 12, a front lower bent section 142 continuous with a lower end of the front down frame section 141 and formed in a curved shape protruding forward and downward, a lower frame section 143 continuous with a rear end of the front lower bent section 142 and extending rearward, the rear lower bent section 144 continuous with a rear end of the lower frame section 143 and formed in a curved shape protruding rearward and downward, and a rear frame section 145 (a first rear frame) continuous with an upper end of the rear lower bent section 144 and extending rearward and upward. The front down frame section 141, the front lower bent section 142, the lower frame section 143, the rear lower bent section 144 and the rear frame section 145 are constituted by an integrated round steel pipe. The rear frame sections 145L and 145R as a pair of left and right first rear frames, the rear upper frames 15L and 15R as a pair of left and right second rear frames, and the rear lower frames 16L and 16R as a pair of left and right third rear frames constitute a pair of left and right rear frames 140L and 140R disposed on the rear section of the vehicle (see FIG. 7).

When seen in a plan view of FIG. 9, the left and right down frames 14L and 14R extend obliquely to be located further outward in the vehicle width direction as they go further rearward from the lower section of the head pipe 12, then, are bent at the front lower bent section 142, extend substantially parallel to the side surface of the vehicle body to reach the rear lower bent section 144, and are bent at the rear lower bent section 144 and extend to be inclined to be located further outward in the vehicle width direction as they go further rearward.

As shown in FIG. 8, a front upper bent section 141a formed in a curved shape protruding rearward and upward is provided on the front down frame section 141. When seen in a side view of FIG. 8, the front down frame section 141 extends rearward and downward from the lower section of the head pipe 12, then, is bent at the front upper bent section 141a, and extends downward substantially vertically.

As shown in FIG. 7, a front middle stage cross frame 147 that bridges between the left and right front down frame sections 141L and 141R in the vehicle width direction is provided between the lower sections of the left and right front down frame sections 141L and 141R. The front middle stage cross frame 147 extends linearly in the vehicle width direction. Both ends of the front middle stage cross frame 147 are connected to the left and right front down frame sections 141L and 141R from an inward side in the vehicle width direction. The front middle stage cross frame 147 is constituted by a round steel pipe having a smaller diameter than that of the down frame 14.

As shown in FIG. 7, a front lower cross frame 148 that bridges between the left and right front lower bent sections 142L and 142R in the vehicle width direction is provided between the left and right front lower bent sections 142L and 142R. The front lower cross frame 148 extends in the vehicle width direction to form a curved shape protruding forward and downward. Both ends of the front lower cross frame 148 are connected to the left and right front lower bent sections 142L and 142R from an inward side in the vehicle width direction. The front lower cross frame 148 is constituted by a round steel pipe having a smaller diameter than that of the down frame 14.

When seen in a side view of FIG. 8, the lower frame section 143 extends substantially in the vehicle forward/rearward direction. As shown in FIG. 7, a lower cross frame 149 that bridges between the left and right lower frames 143L and 143R in the vehicle width direction is provided between the left and right lower frame sections 143L and 143R. The lower cross frame 149 extends linearly in the vehicle width direction. Both ends of the lower cross frame 149 are connected to the left and right lower frame sections 143L and 143R from an inward side in the vehicle width direction. The lower cross frame 149 is constituted by a round steel pipe having substantially the same diameter as that of the down frame 14.

When seen in a plan view of FIG. 9, the left and right rear lower bent sections 144L and 144R are inclined to be located further outward in the vehicle width direction as they are located further upward.

When seen in a plan view of FIG. 9, the lower sections of the left and right rear frame sections 145L and 145R are inclined to be located further outward in the vehicle width direction as they are located further upward according to inclinations of the rear lower bent sections 144L and 144R. The left and right rear frame sections 145L and 145R are curved gently inward in the vehicle width direction above the lower sections thereof, and extend substantially parallel to the side surface of the vehicle body.

As shown in FIG. 7, a pair of left and right step support stays 135L and 135R configured to support pillion steps (not shown) are provided on the lower sections of the left and right rear frame sections 145L and 145R. The left and right step support stays 135L and 135R include step support stay main bodies 136L and 136R extending rearward from the lower sections of the rear frame sections 145L and 145R, and step support sections 137L and 137R extending upward from the rear end portions of the step support stay main bodies 136L and 136R.

When seen in a side view of FIG. 8, the step support stay main body 136 extends forward and rearward. When seen in a plan view of FIG. 9, the left and right step support stay main bodies 136L and 136R extend to be curved to be located outward in the vehicle width direction as they go rearward. As shown in FIG. 8, the front end of the step support stay main body 136 is connected to the lower sections of the left and right rear frame sections 145 from behind. The step support stay main body 136 is constituted by a round steel pipe having a smaller diameter than that of the down frame 14.

<Middle Frame>

When seen in a side view of FIG. 8, the middle frames 139 extend linearly rearward and downward. Front upper ends of the middle frames 139 are connected to a vertically intermediate section of the front down frame section 141 from a rearward side. Rear lower ends of the middle frames 139 are connected to the rear section of the lower frame section 143 from above.

When seen in a plan view of FIG. 9, the left and right middle frames 139L and 139R are disposed to be located between the left and right upper frames 13L and 13R and the left and right lower frame sections 143L and 143R. When seen in a plan view of FIG. 9, the left and right middle frames 139L and 139R extend substantially parallel to the side surface of the vehicle body.

<Rear Upper Frame>

When seen in a side view of FIG. 8, the rear upper frame 15 includes a rear upper front half section 151 (a front-side extension section) extending linearly from an upper end portion to a front lower side of the rear frame section 145, an intermediate curved section 152 continuous with a rear end of the rear upper front half section 151 and having a curved shape protruding forward and upward, and a rear upper rear half section 153 continuous with a rear end of the intermediate curved section 152 and extending linearly rearward and upward to be inclined more gently than the rear upper front half section 151. The rear upper front half section 151, the intermediate curved section 152 and the rear upper rear half section 153 are constituted by an integrated round steel pipe. A front lower end of the rear upper front half section 151 is connected to the upper frame front half section 131 from above and to the rear.

When seen in a plan view of FIG. 9, the left and right upper frame front half sections 131L and 131R extend to be inclined to be located outward in the vehicle width direction as they go rearward from a connecting section with a center cross frame 155 to the intermediate curved sections 152L and 152R. When seen in a plan view of FIG. 9, the left and right rear upper rear half sections 153L and 153R extend to be inclined to be located inward in the vehicle width direction as they go rearward from the intermediate curved sections 152L and 152R to the rear end.

As shown in FIG. 7, the center cross frame 155 that bridges between the left and right rear upper front half sections 151L and 151R in the vehicle width direction is provided between the front end portions of the left and right rear upper front half sections 151L and 151R. The center cross frame 155 forms a curved shape protruding forward and upward and extends in the vehicle width direction. In other words, the center cross frame 155 is formed in a U shape that opens rearward and downward (an inverted U shape). Both ends of the center cross frame 155 are connected to the front end portions of the left and right rear upper front half sections 151L and 151R from a front upper side. The center cross frame 155 is constituted by a round steel pipe having a smaller diameter than that of the rear upper frame 15.

A rear end cross frame 156 and a rear end cross plate 157 that cross between the left and right rear upper rear half sections 153L and 153R in the vehicle width direction are provided between the rear end portions of the left and right rear upper rear half sections 153L and 153R.

The rear end cross frame 156 extends linearly in the vehicle width direction. Both ends of the rear end cross frame 156 are connected to the rear end portions of the left and right rear upper rear half sections 153L and 153R from an inward sides in the vehicle width direction. The rear end cross frame 156 is constituted by a round steel pipe having substantially the same diameter as that of the rear upper frame 15.

The rear end cross plate 157 extends in the vehicle width direction to form a U shape that opens rearward. Both ends of the rear end cross plate 157 are connected to the rear end portions of the left and right rear upper rear half sections 153L and 153R from above.

<Rear Lower Frame>

When seen in a side view of FIG. 8, the rear lower frame 16 extends substantially parallel to the rear upper front half section 151. The front end of the rear lower frame 16 is connected to the vertically intermediate section of the rear frame section 145 from a rear side. The rear end of the rear lower frame 16 is connected to the longitudinal intermediate section of the rear upper rear half section 153 from below.

As shown in FIG. 7, a rear lower cross frame 159 that bridges between the left and right rear lower frames 16L and 16R in the vehicle width direction is provided between the left and right rear lower frames 16L and 16R. The rear lower cross frame 159 is formed in a curved shape protruding downward and extends in the vehicle width direction. Both ends of the rear lower cross frame 159 are connected to the longitudinal intermediate sections of the left and right rear lower frames 16L and 16R from an inward side in the vehicle width direction. The rear lower cross frame 159 is constituted by a round steel pipe having substantially the same diameter as that of the rear lower frame 16.

<Gusset>

As shown in FIG. 8, various gussets configured to reinforce elements of the vehicle body frame 11 are provided on the vehicle body frame 11.

An intermediate gusset 161 configured to connect the front upper end portions of the upper frames 13 and the front upper end portions of the down frames 14 is provided on the vertically intermediate section of the head pipe 12.

A front gusset 162 configured to reinforce the front upper sections of the down frames 14 is provided on the lower section of the head pipe 12.

An upper gusset 163 configured to reinforce the upper frames 13 and the down frames 14 is provided between the upper frame front half section 131 and the front down frame section 141.

A lower gusset 164 configured to reinforce the upper frames 13 and the down frames 14 is provided between the front lower curved section 132 and the lower frame section 143.

A side gusset 165 configured to connect the front end portion of the rear lower frame 16 and the front end portion of the step support stay 135 is provided on the vertically intermediate section of the rear frame section 145.

A middle gusset 166 configured to reinforce the rear upper frames 15 and the upper frames 13 is provided between the rear upper front half section 151 and the upper frame front half section 131.

A rear gusset 167 configured to reinforce the rear lower frame 16 and the rear upper frames 15 is provided between the rear lower frame 16 and the rear upper rear half section 153.

<Battery Disposition Structure>

As shown in FIG. 4, a battery disposition structure 100A including the pair of left and right rear frames 140L and 140R, and the rear battery 102 disposed between the left and right rear frames 140L and 140R is provided on the rear section of the vehicle.

The battery disposition structure 100A further includes the rear battery 102 disposed behind the front case 103 configured to accommodate the front battery 101, a pair of left and right first upper brackets 105L and 105R protruding rearward and downward from the rear sections of the pair of left and right rear upper frames 15L and 15R, the pair of left and right rear lower frames 16L and 16R and the left and right rear upper front half sections 151L and 151R, a pair of left and right first lower brackets 106L and 106R protruding forward and upward from the lower sections of the left and right rear frame sections 145L and 145R, a pair of left and right second upper brackets 107L and 107R protruding rearward and downward from the front section of the left and right rear lower frames 16, a pair of left and right battery support sections 108L and 108R extending rearward from the lower sections of the left and right rear frame sections 145L and 145R, and a power unit support structure 170 extending rearward from the rear lower sections of the left and right down frames 14L and 14R and configured to swingably support the power unit 10.

<First Upper Bracket>

As shown in FIG. 7, the left and right first upper brackets 105L and 105R are connected to the rear sections of the left and right rear upper front half sections 151L and 151R from below. As shown in FIG. 8, a through-hole 105h (hereinafter, referred to as a "first upper through-hole 105h") that opens in the vehicle width direction and through which a shaft section of a bolt can be inserted is formed in the first upper bracket 105.

<First Lower Bracket>

As shown in FIG. 7, the left and right first lower brackets 106L and 106R are connected to the left and right rear frame sections 145L and 145R from a forward side. The left and right first lower brackets 106L and 106R are disposed on a side opposite to the left and right battery support sections 108L and 108R with the left and right rear frame sections 145L and 145R interposed therebetween. As shown in FIG. 8, a through-hole 106h (hereinafter, referred to as a "first lower through-hole 106h") that opens in the vehicle width direction and through which a shaft section of a bolt can be inserted is formed in the first lower bracket 106.

<Second Upper Bracket>

As shown in FIG. 7, the left and right second upper brackets 107L and 107R are connected to the front sections of the left and right rear lower frames 16L and 16R from below. As shown in FIG. 8, a through-hole 107h (hereinafter, referred to as a "second upper through-hole 107h") that opens in the vehicle width direction and through which a shaft section of a bolt can be inserted is formed in a second upper bracket 107.

<Battery Support Section>

As shown in FIG. 7, the left and right battery support sections 108L and 108R include left and right battery support stay main bodies 108aL and 108aR extending rearward from the lower sections of the left and right rear frame sections 145L and 145R, and second lower brackets 108bL and 108bR extending rearward from the rear end portions of the battery support stay main bodies 108aL and 108aR.

When seen in a side view in a FIG. 8, a battery support stay 108 extends gently to be inclined and located upward as it goes rearward. When seen in a plan view of FIG. 9, the left and right battery support stays 108L and 108R extend to be inclined to be located inward in the vehicle width direction as they go rearward. When seen in a plan view of FIG. 9, the left and right battery support stays 108L and 108R are located on a side further inward in the vehicle width direction than the left and right step support stays 135L and 135R.

As shown in FIG. 8, a front end of a battery support stay main body 108a is connected to the lower section of the rear frame section 145 from behind. The battery support stay main body 108a is constituted by a round steel pipe having a smaller diameter than that of the down frame 14.

A through-hole 108h (hereinafter, referred to as a "second lower through-hole 108h") that opens in the vehicle width direction and through which a shaft section of a bolt can be inserted is formed in a second lower bracket 108b.

For example, a bolt is inserted through the first upper through-hole 105h, the first lower through-hole 106h, the second upper through-hole 107h and the second lower through-hole 108h (see FIG. 8) from an outward side in the vehicle width direction such that a shaft section of the bolt protrudes therethrough. Then, since the protrusion of the shaft section is screwed into a female screw section (not shown) formed on left and right side portions of the case support structure 110, the case support structure 110 can be fixed to the brackets 105, 106, 107 and 108b.

In FIG. 8, reference numerals 171L and 171R designate a pair of left and right lower brackets provided along the rear lower bent sections 144L and 144R in the left and right down frames 14L and 14R. Reference numerals 172L and 172R designate a pair of left and right rearward extension sections extending rearward from lower sides of the left and right rear frame sections 145L and 145R.

<Peripheral Structure of Head Pipe>

Figure 10:
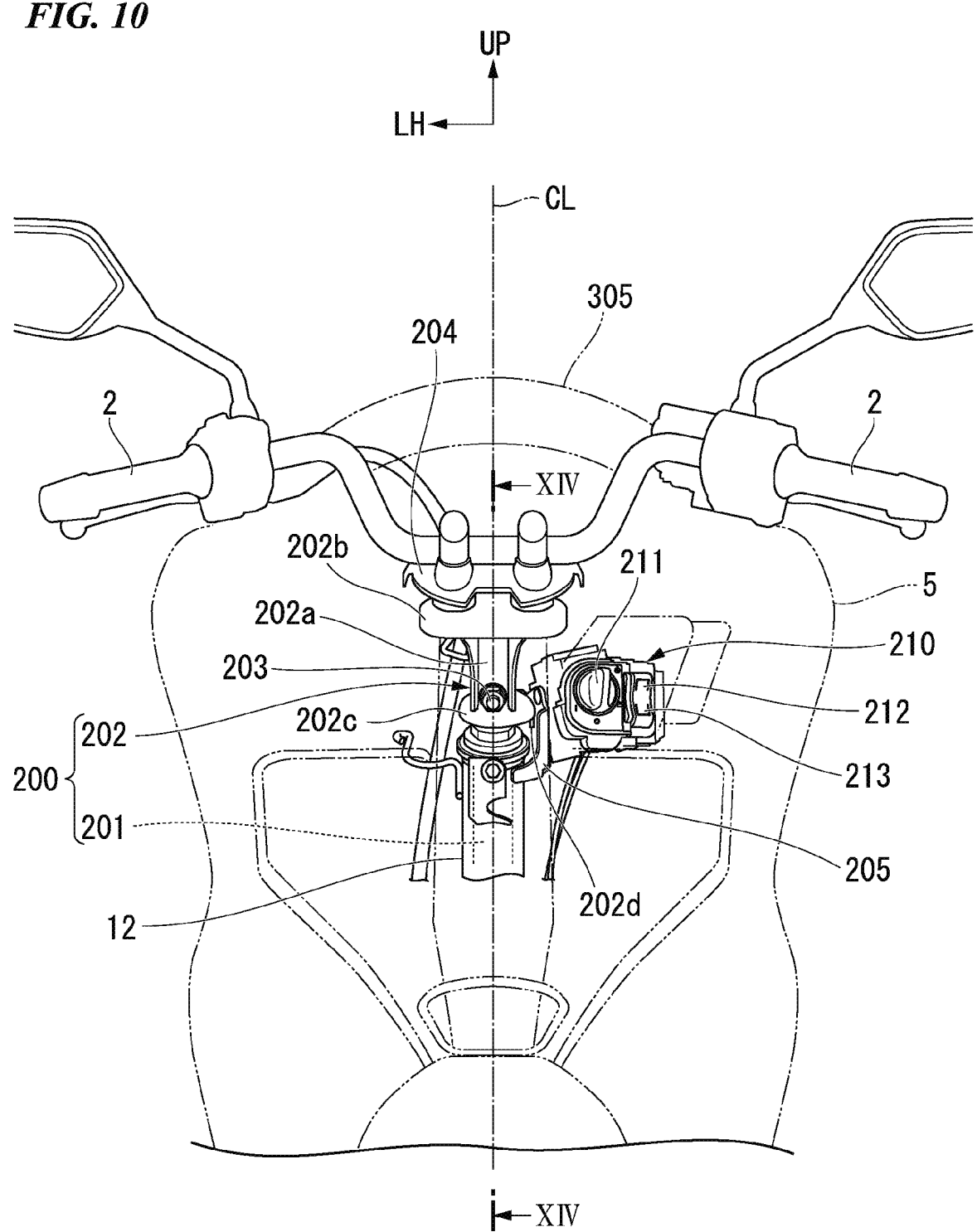
FIG. 10 is a rear view showing a peripheral structure of a head pipe according to the embodiment.

As shown in FIG. 10, a steering shaft 200 is attached to the head pipe 12. The steering shaft 200 includes a shaft main body 201 inserted into the head pipe 12 and pivotably supported therein, and a handle post 202 connected to a portion of the shaft main body 201 protruding upward from the head pipe 12 (an upper section of the shaft main body 201).

The handle post 202 includes a tube section 202a into which an upper section of the shaft main body 201 is inserted and not pivotably connected by a bolt 203, a stay section 202b connected to cover an upper end of the tube section 202a and extending from both sides in the vehicle width direction, a cup section 202c curved outward and downward from a lower end of the tube section 202a in the radial direction, and a downward extension piece 202d extending downward from a right end portion of the cup section 202c. In FIG. 10, reference numeral 204 designates a handle holder fixed to the stay section 202b.

A switch bracket 205 configured to support a switch holder 210 is attached to a right upper end portion of the head pipe 12. For example, the switch bracket 205 is coupled to the head pipe 12 through welding or the like.

Figure 11:
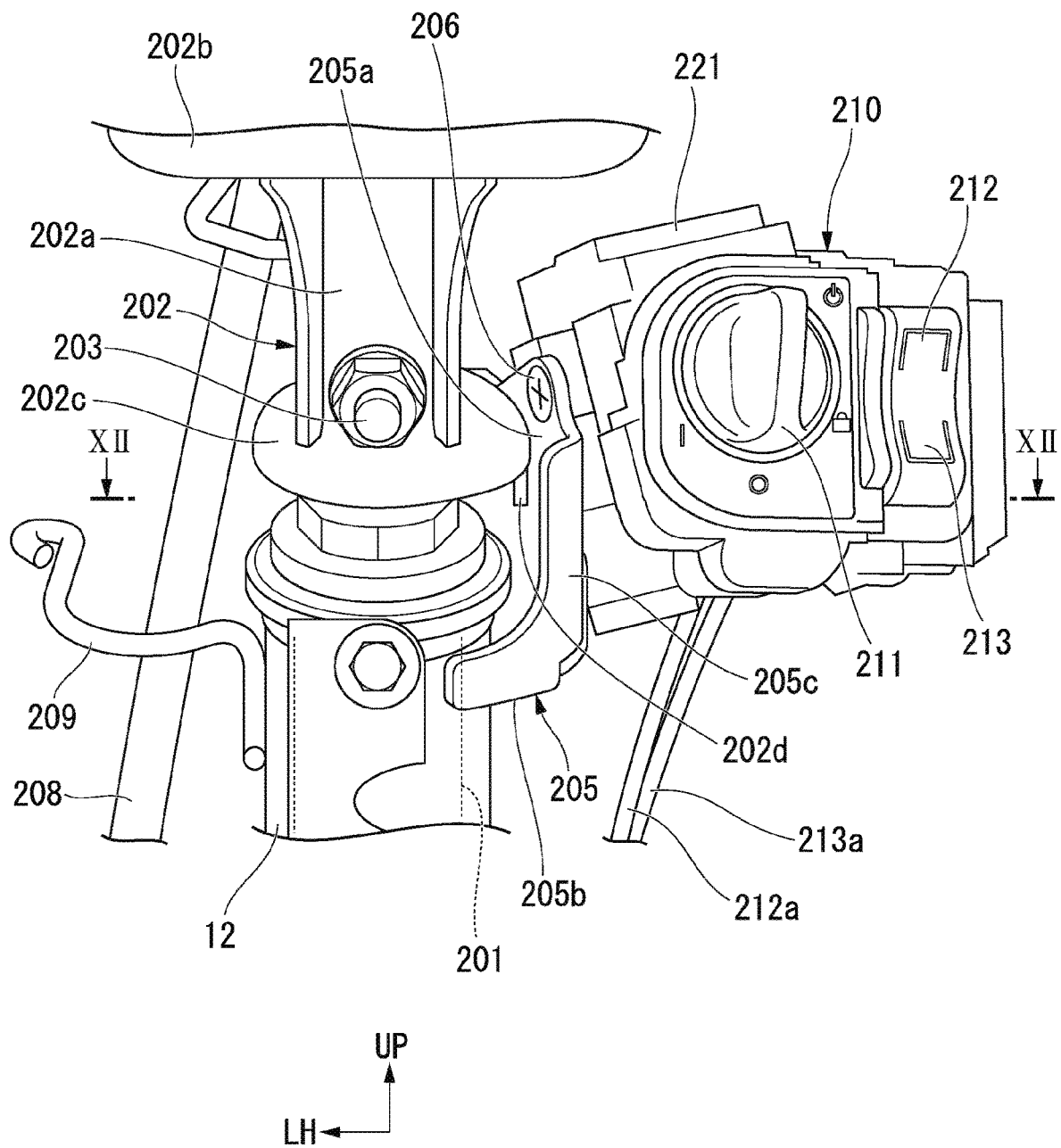
FIG. 11 is an enlarged view of a major part in FIG. 10.

As shown in FIG. 11, the switch bracket 205 is formed in an L shape extending rightward from a right upper end portion of the head pipe 12 and then extending to be bent upward. The switch bracket 205 includes a bracket main body 205a disposed on a side of the downward extension piece 202d, a connecting section 205b configured to connect the bracket main body 205a and the right upper end portion of the head pipe 12, and a flange section 205c configured to connect the bracket main body 205a and the connecting section 205b.

The switch holder 210 is fixed to the bracket main body 205a by a bolt 206. A lock knob 211 that is an operating part configured to lock the handle 2 (see FIG. 10), a seat switch 212 that is an operating part configured to open the seat 8 (see FIG. 1), and a lid switch 213 that is an operating part configured to open a lid 240 (see FIG. 13) are provided on the switch holder 210.

The lock knob 211, the seat switch 212 and the lid switch 213 are operably disposed from behind the switch holder 210. When seen in a rear view of FIG. 11, the lock knob 211 is provided on an inner side of the switch holder 210 in the vehicle width direction. When seen in a rear view of FIG. 11, the seat switch 212 is provided on an outer upper section of the switch holder 210 in the vehicle width direction. When seen in a rear view of FIG. 11, the lid switch 213 is provided on an outer lower section of the switch holder 210 in the vehicle width direction. The seat switch 212 and the lid switch 213 are integrally provided to extend upward and downward on a right side of the lock knob 211.

For example, the seat 8 (see FIG. 1) can be opened by pressing the seat switch 212. For example, the lid (see FIG. 13) can be opened by pressing the lid switch 213 (see FIG. 17). For example, the handle 2 (see FIG. 10) can be locked by turning the lock knob 211 leftward (counterclockwise).

In FIG. 11, reference numeral 208 designates a brake cable, reference numeral 209 designates a cable guide, reference numeral 212a designates a seat wire, reference numeral 213a designates a lid wire, and reference numeral 221 designates a smart unit including a microcomputer.

Figure 12:
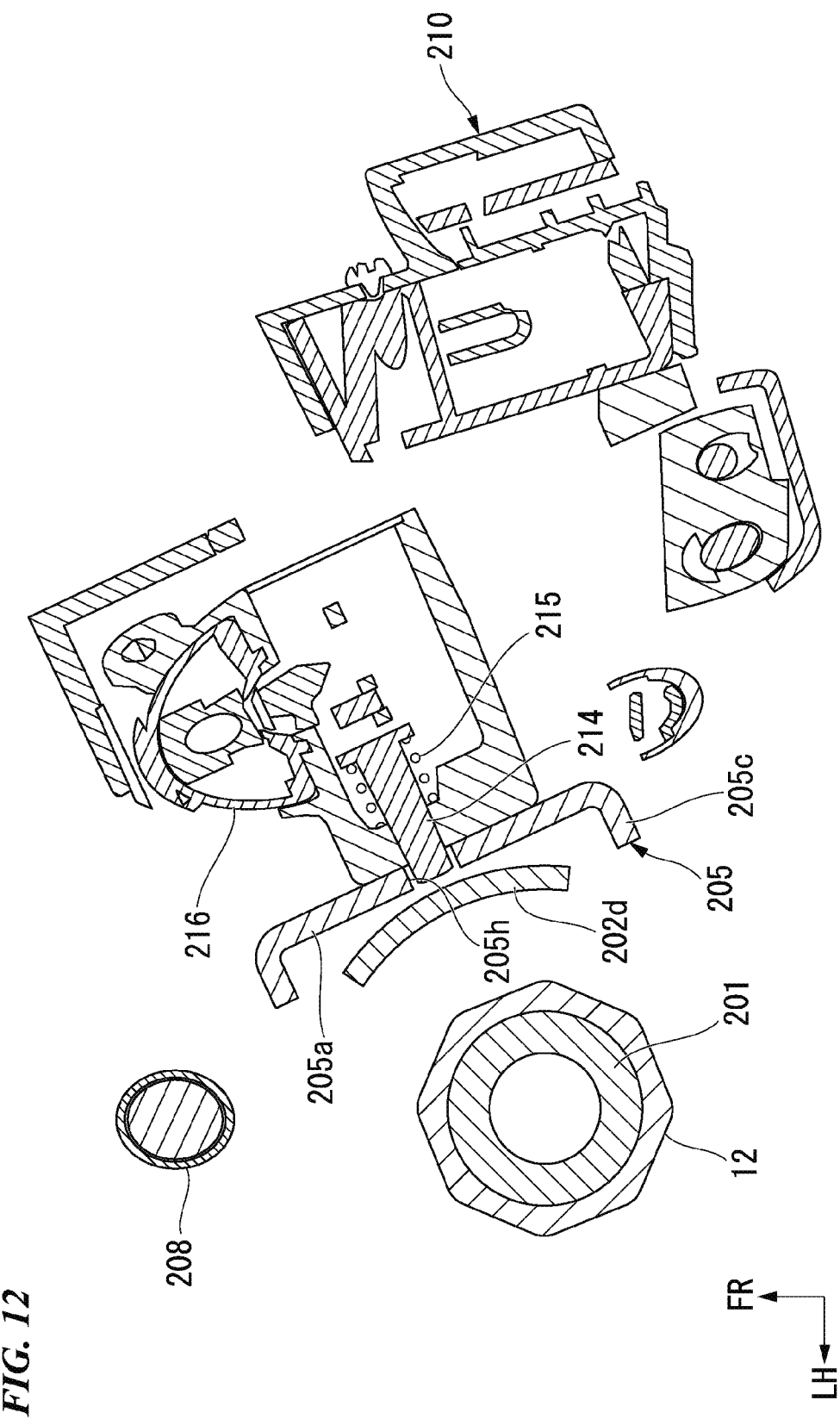
FIG. 12 is a view including a cross section along line XII-XII in FIG. 11.

In FIG. 12, reference numeral 214 designates a lock pin driven by an operation of the lock knob 211 (see FIG. 11), reference numeral 215 designates a biasing member configured to bias the lock pin 214 in a direction away from the head pipe 12, and reference numeral 216 designates a solenoid configured to release locking that restricts pivotal movement of the lock knob 211 (see FIG. 11).

For example, the biasing member 215 is a coil spring. The lock pin 214 approaches the head pipe 12 against a biasing force of the biasing member 215 according to pivotal movement of the lock knob 211 (see FIG. 11). The lock pin 214 approaches the head pipe 12 via a through-hole 205h of the bracket main body 205a. When the lock pin 214 approaches the head pipe 12 and is engaged with the downward extension piece 202d, the handle 2 (see FIG. 10) is locked.

When the solenoid 216 is not energized (when an unlocking operation is not being performed), since a plunger (not shown) of the solenoid 216 is engaged with the lock pin 214, movement of the lock pin 214 is prohibited.

When the solenoid 216 is energized (when the unlocking operation is being performed), since the plunger of the solenoid 216 is separated from the lock pin 214, movement of the lock pin 214 is allowed. When movement of the lock pin 214 is allowed, the lock pin 214 is pulled by the biasing force of the biasing member 215 in a direction away from the head pipe 12. When the lock pin 214 is pulled, engagement between the lock pin 214 and the downward extension piece 202d is released, and a handle lock is unlocked.

<Peripheral Structure of Center Tunnel>

Figure 13:
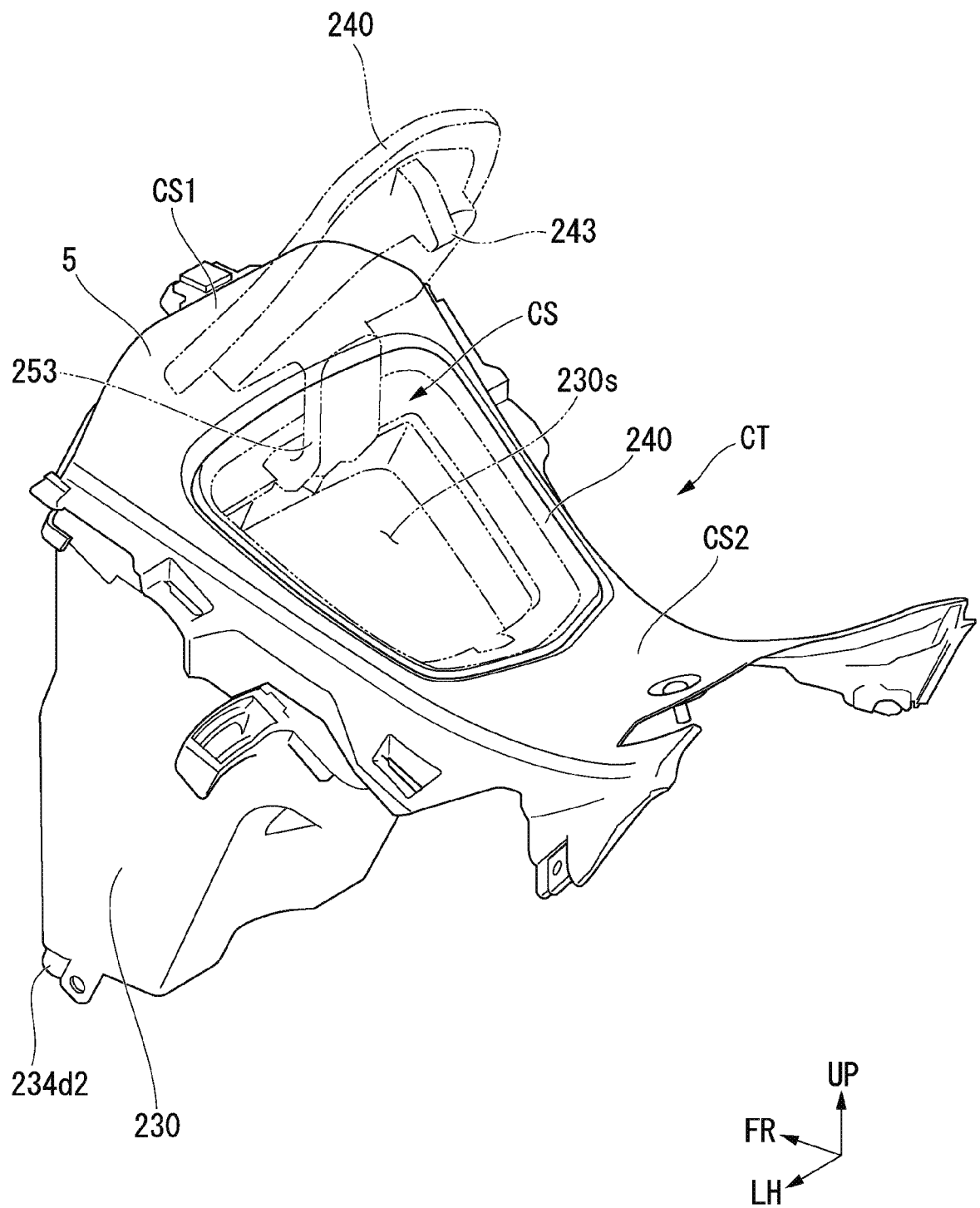
FIG. 13 is a perspective view of an opening/closing structure of a lid according to the embodiment from behind and to the left.

As shown in FIG. 13, a cover inclined surface CS that is inclined to be located downward as it goes rearward with respect to the ground plane is provided on the center tunnel CT. The lid 240 configured to open and close a cord accommodating section 230 is provided on the center tunnel CT. The lid 240 is disposed on the upper section of the center tunnel CT. Accordingly, an opening/closing state of the lid 240 can be easily visually checked. In addition, an opening/closing operation of the lid 240 can be easily performed.

In FIG. 13, the case in which the lid 240 is in a closed state is shown by a solid line, and the case in which the lid 240 is in an open state is shown by a two-dot dashed line.

When the lid 240 is in a closed state, the cover inclined surface CS is substantially flush and continuous with the upper surface of the lid 240. Hereinafter, a portion located at an upper section (a front upper section) of the cover inclined surface CS is referred to as an "inclined surface upper section CS1," and a portion located at a lower section (a rear lower section) of the cover inclined surface CS is also referred to as an "inclined surface lower section CS2." The inclined surface upper section CS1 corresponds to a front end portion of the upper surface section CT1 (see FIG. 6). The inclined surface lower section CS2 corresponds to a rear end portion of the upper surface section CT1 (see FIG. 6). The inclined surface lower section CS2 corresponds to a portion including the lowermost section CT2 (see FIG. 6).

<Lid Opening/Closing Detection Unit>

Figure 14:
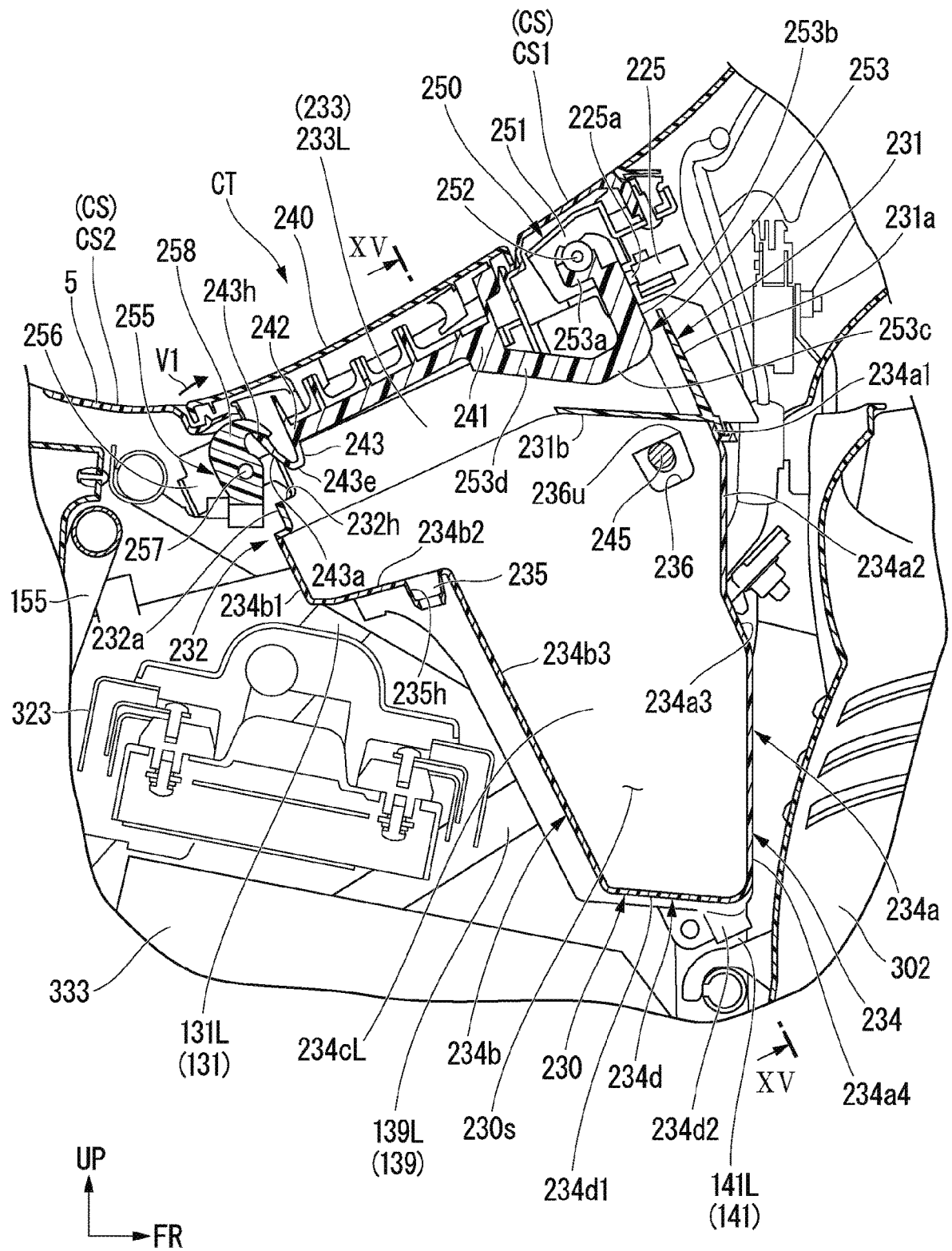
FIG. 14 is a view including a cross section along line XIV-XIV in FIG. 10.

As shown in FIG. 14, a lid opening/closing detection unit 225 configured to detect an opening/closing state of the lid 240 is provided on the center tunnel CT. The lid opening/closing detection unit 225 is disposed in the vicinity of the inclined surface upper section CS1. For example, the lid opening/closing detection unit 225 includes a contact displacement sensor 225a.

The lid opening/closing detection unit 225 determines an opening/closing state of the lid 240 on the basis of a gap generated between the lid 240 and the vehicle body cover 5. Here, the gap means a gap generated between the lid 240 and the vehicle body cover 5 when a charging cord 245 is sandwiched between the lid 240 and the vehicle body cover 5. A size of the gap is substantially the same as an outer diameter dimension of a portion of the charging cord 245 sandwiched between the lid 240 and the vehicle body cover 5. For example, when the lid 240 is closed in a state in which the charging cord 245 is drawn from the cord accommodating section 230 to the outside (see FIGS. 18(b) and 18(c)), a gap corresponding to an outer diameter dimension of the charging cord 245 is generated between the lid 240 and the vehicle body cover 5.

Figure 16:
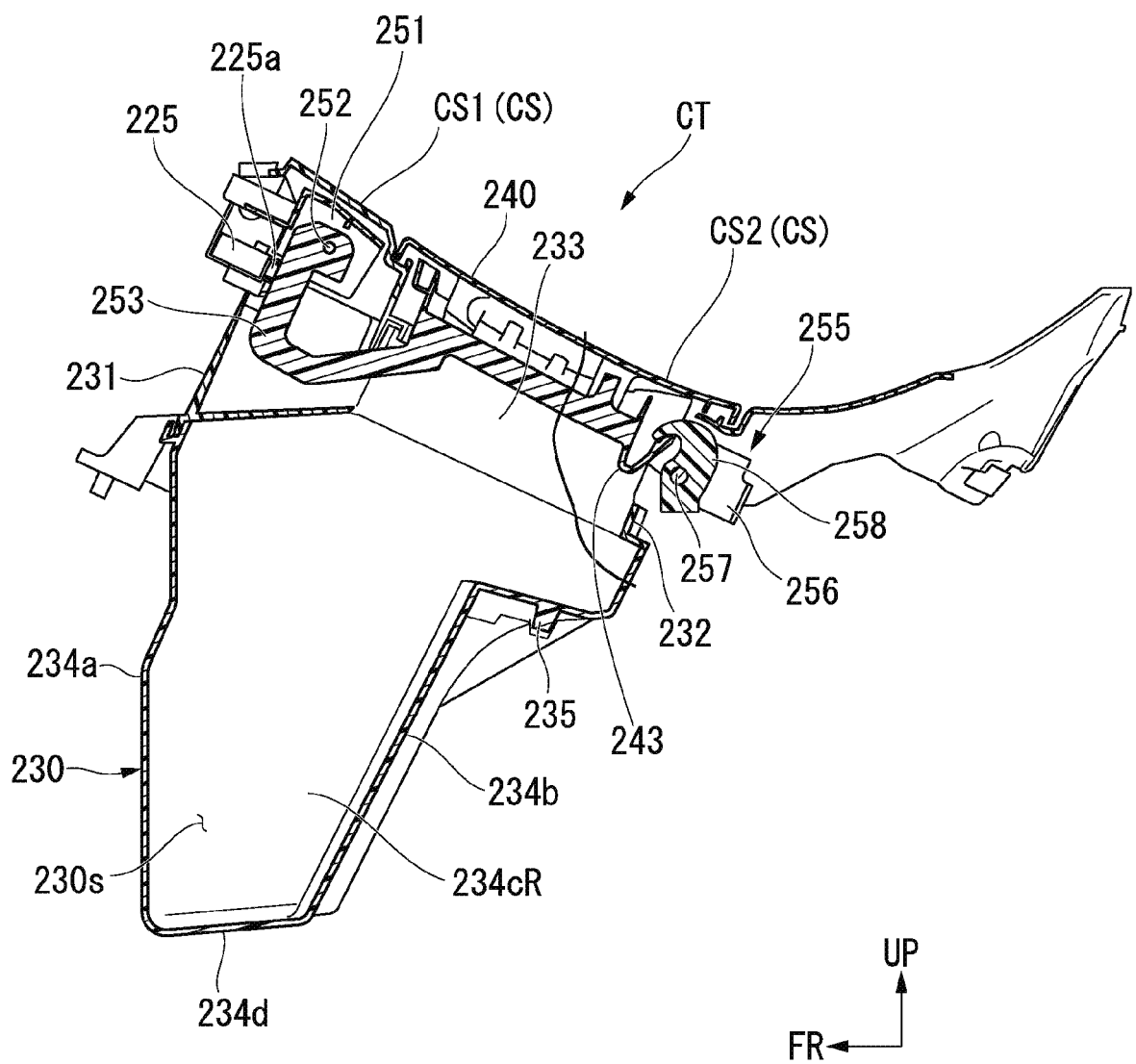
FIG. 16 is a view including a cross section showing a closed state of the lid according to the embodiment.
Figure 17:
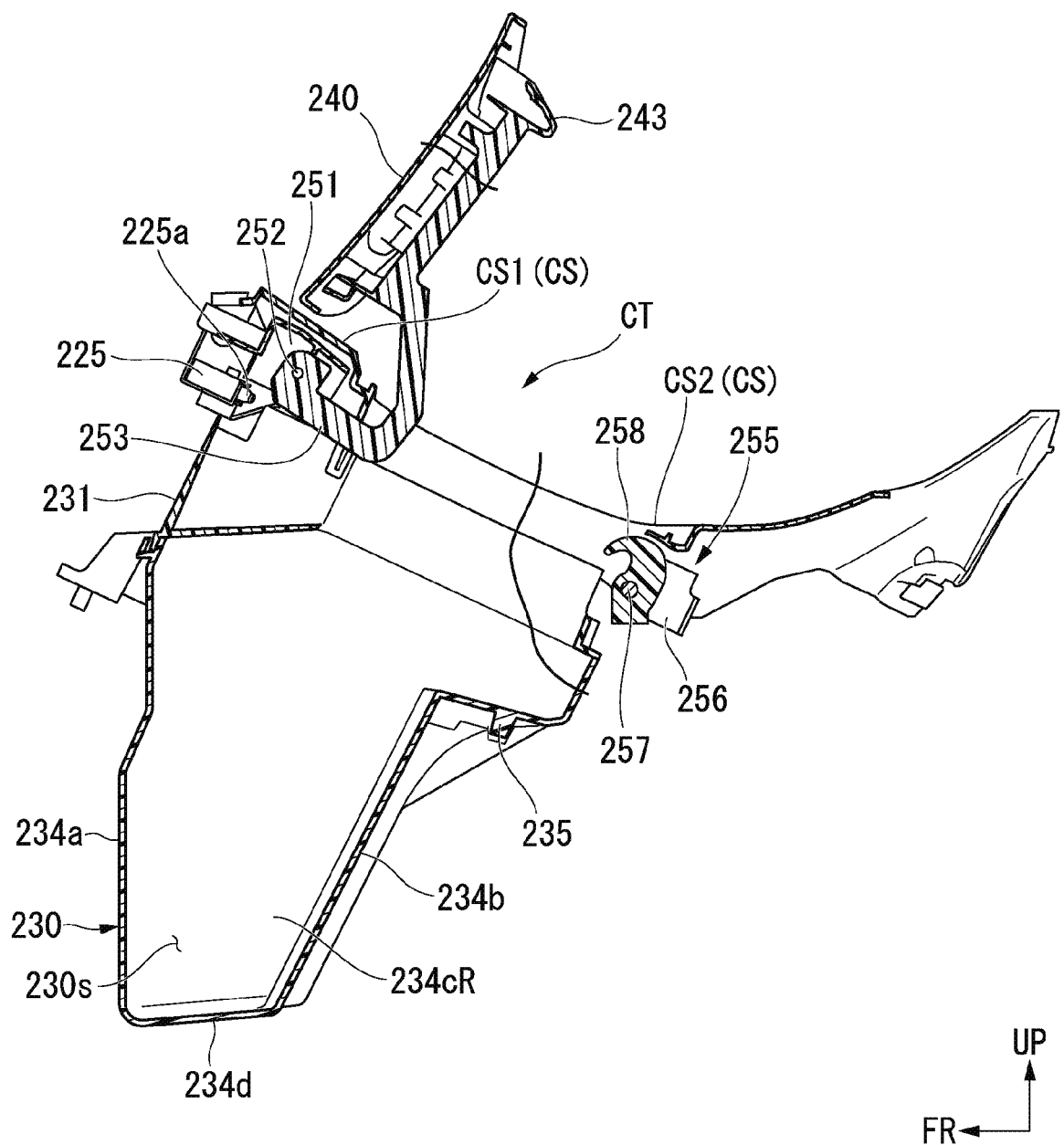
FIG. 17 is a view including a cross section showing an open state of the lid according to the embodiment.

The lid opening/closing detection unit 225 determines the size of the gap on the basis of a pushing depth of a hinge arm 253. FIG. 16 shows a state in which the contact displacement sensor 225a is pressed by the hinge arm 253. FIG. 17 shows a state in which the contact displacement sensor 225a is not pressed by the hinge arm 253.

The lid opening/closing detection unit 225 determines that the lid 240 is in an open state when the gap is equal to or larger than a minimum outer diameter dimension of the charging cord 245.

The lid opening/closing detection unit 225 determines that the lid 240 is in a closed state when the gap is less than the minimum outer diameter dimension of the charging cord 245.

Here, the minimum outer diameter dimension of the charging cord 245 means a minimum diameter dimension in an outer diameter dimension of the charging cord 245 in an extension direction of the charging cord 245. When the charging cord 245 is protected by a protective tube or the like, the outer diameter dimension of the charging cord 245 includes a dimension including a thickness of the protective tube or the like.

For example, the charging cord 245 is a curled cord, which is freely deformable. A connecting plug 246 (see FIG. 18) that is connectable to an external power supply is provided on the charging cord 245. The charging cord 245 connects a charger 325 (see FIG. 6) and the external power supply.

Figure 18:
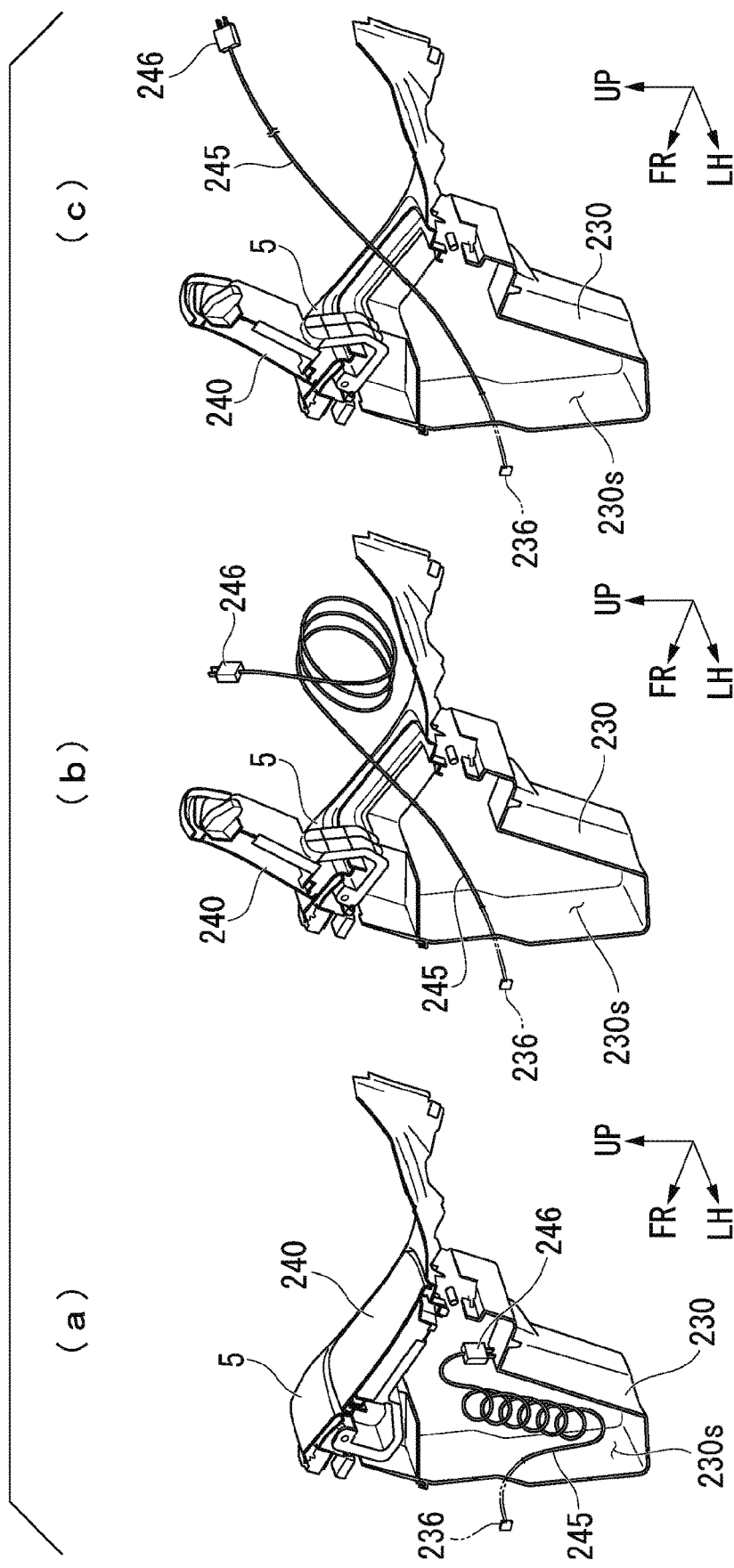
FIG. 18 is a perspective view showing a charging cord according to the embodiment.

For example, in a state in which the charging cord 245 is wound in a spiral shape (see FIG. 18(*a*)), the charging cord 245 can be accommodated in the cord accommodating section 230.

For example, in a state in which a part of the charging cord 245 is wound in a spiral shape (see FIG. 18(*b*)), the charging cord 245 can be drawn outside the cord accommodating section 230.

For example, in a state in which winding of the charging cord 245 is released (see FIG. 18(*c*)), the charging cord 245 can be drawn to a position far from a cord drawing section 236.

<Reporting Means>

A reporting means 226 (see FIG. 19) configured to report the opening or closing to an occupant on the basis of a detection result of the lid opening/closing detection unit 225 is provided in the center tunnel CT. When seen in a front view of FIG. 19, the reporting means 226 is disposed on a side opposite to a horn 227 with a vehicle body lateral centerline CL interposed therebetween. The reporting means 226 is disposed on a left side of the vehicle body. For example, the reporting means 226 is a speaker. For example, the reporting means 226 is used as an approach reporting means outside the vehicle. For example, the reporting means 226 emits a reporting sound to the outside from starting of the vehicle to a predetermined speed.

Incidentally, the reporting means 226 may emit an alarm (a first alarm) when the lid opening/closing detection unit 225 detects an open state of the lid 240. For example, the reporting means 226 emits a second alarm different from the first alarm when the lid opening/closing detection unit 225 detects a closed state of the lid 240. The reporting means 226 may not emit an alarm when the lid opening/closing detection unit 225 detects a closed state of the lid 240.

Figure 19:
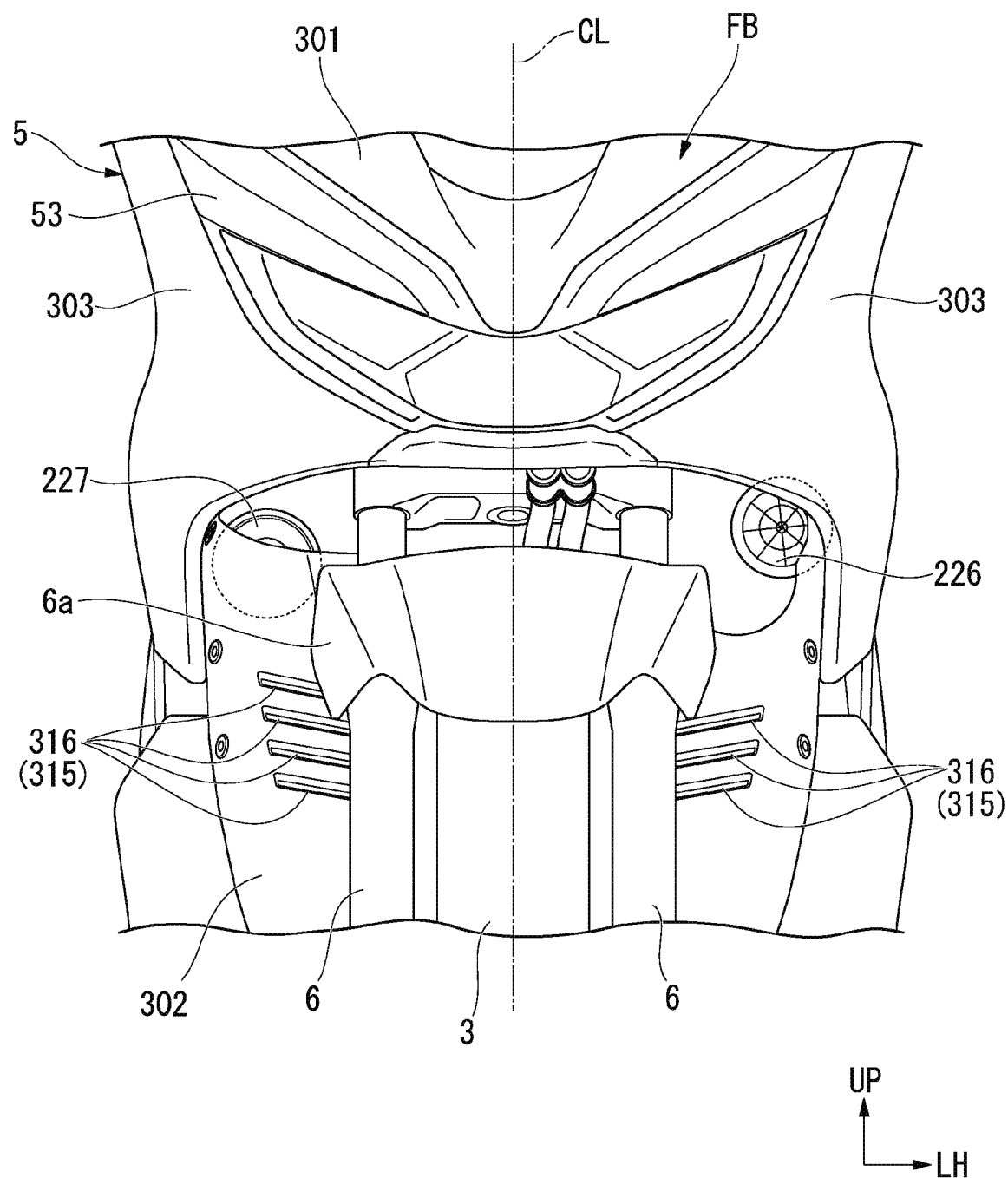
FIG. 19 is a front view showing disposition of a reporting means according to the embodiment.

In FIG. 19, reference numeral 303 designates a pair of left and right front side covers configured to cover left and right side portions of the front body FB from outward sides. As shown in FIG. 19, the air guide hole 315 on the left side has the openings 316 that are disposed in a vertical three-stage shape, and the air guide hole 315 on the right side has the openings 316 that are disposed in a vertical four-stage shape.

<Hinge Mechanism>

As shown in FIG. 14, a hinge mechanism 250 configured to open and close the lid 240 is provided on the center tunnel CT. The hinge mechanism 250 is disposed in the vicinity of the inclined surface upper section CS1.

The hinge mechanism 250 includes a hinge bracket 251 fixed to a lower section of the inclined surface upper section CS1, a hinge shaft 252 extending in the vehicle width direction and having an end portion fixed to the hinge bracket 251, and the hinge arm 253 pivotably attached to the hinge shaft 252.

When seen in a cross-sectional view of FIG. 14, the hinge arm 253 includes a hinge shaft support section 253*a* pivotably attached to the hinge shaft 252, an arm front half section 253*b* extending linearly from the hinge shaft support section 253*a* to be inclined forward and downward, an arm intermediate section 253*c* continuous with a lower end of the arm front half section 253*b* and extending to be inclined rearward and downward, and an arm rear half section 253*d* continuous with a rear end of the arm intermediate section 253*c* and extending to be inclined rearward and upward. A front lower section 241 of the lid 240 is connected to the rear end of the arm rear half section 253*d*.

A forward downward protrusion 243 protruding forward and downward is provided on a rear lower section 242 of the lid 240. When seen in a cross-sectional view of FIG. 14, the forward downward protrusion 243 includes a locking wall 243*a* inclined to be located upward as it goes rearward. A locking hole 243*h* that opens forward and rearward and through which a hook 258 of a lock mechanism 255 can be inserted is formed in the locking wall 243*a*.

<Lock Mechanism>

As shown in FIG. 14, the lock mechanism 255 configured to lock the lid 240 is provided in the center tunnel CT. The lock mechanism 255 is disposed in the vicinity of the inclined surface lower section CS2.

The lock mechanism 255 includes a lock bracket 256 fixed to a lower section of the inclined surface lower section CS2, a lock shaft 257 extending in the vehicle width direction and having an end portion fixed to the lock bracket 256, the hook 258 pivotably attached to the lock shaft 257, a biasing member (not shown) connected to the lock bracket 256 and the hook 258, a lid wire 213*a* (see FIG. 11) connected to the hook 258, and an actuator (not shown) configured to pivot the hook 258.

The biasing member (not shown) applies a biasing force in an arrow V1 direction around the lock shaft 257 with respect to the hook 258 such that the hook 258 is locked to the locking wall 243*a*. For example, the biasing member is a coil spring.

The actuator (not shown) can apply a force in a direction opposite to the arrow V1 direction with respect to the hook 258 against the biasing force of the biasing member such that the hook 258 is removed from the locking wall 243*a*. For example, a cable (not shown) is connected to between the hook 258 and the actuator. The actuator can release engagement of the hook 258 by pulling the cable (not shown) against the biasing force of the biasing member.

<Cord Accommodating Section>

As shown in FIG. 14, the cord accommodating section 230 configured to accommodate the charging cord 245 is provided in the center tunnel CT. The cord accommodating section 230 is formed in a box shape that opens upward. Articles other than the charging cord 245 can be accommodated in the cord accommodating section 230. For example, in a state in which the charging cord 245 is accommodated in the cord accommodating section 230, other articles can also be accommodated in the cord accommodating section 230.

The cord accommodating section 230 is disposed between front and rear sides of the left and right front down frame section 141L and the center cross frame 155. The upper section of the cord accommodating section 230 is disposed between the left and right upper frame front half sections 131L and 131R in the vehicle width direction. The lower section of the cord accommodating section 230 is disposed between the left and right middle frames 139L and 139R in the vehicle width direction.

The cord accommodating section 230 includes a hinge accommodating section 231 configured to accommodate the hinge mechanism 250, a lock accommodating section 232 configured to accommodate the lock mechanism 255, a pair of left and right connecting sections 233L and 233R configured to connect the hinge accommodating section 231 and the lock accommodating section 232, and a cord accommodating main body 234 configured to accommodate the charging cord 245.

The hinge accommodating section 231 is disposed on a front upper side of the cord accommodating main body 234. The hinge accommodating section 231 is located in the vicinity of the inclined surface upper section CS1. When the lid 240 is in a closed state, the hinge accommodating section 231 includes a hinge front wall 231a disposed on a front side of the hinge mechanism 250, and a hinge lower wall 231b disposed below the hinge mechanism 250. When seen in a cross-sectional view of FIG. 14, the hinge front wall 231a extends linearly to be inclined to be located downward as it goes forward. When seen in a cross-sectional view of FIG. 14, the hinge lower wall 231b is continuous with a lower end of the hinge front wall 231a, and extends linearly to be inclined to be located upward as it goes rearward.

The lock accommodating section 232 is disposed on a rear upper side of the cord accommodating main body 234. The lock accommodating section 232 is disposed in the vicinity of the inclined surface lower section CS2. When the lid 240 is in a closed state, the lock accommodating section 232 includes a lock lower wall 232a disposed below the lock mechanism 255. When seen in a cross-sectional view of FIG. 14, the lock lower wall 232a is formed in an L shape inclined to be located below as it goes forward substantially parallel to the hinge front wall 231a, and then, extending to be curved rearward and downward. An opening section 232h that opens forward and rearward to allow pivotal movement of the hook 258 in the lock mechanism 255 is provided in the lock accommodating section 232.

The left and right connecting sections 233L and 233R cross front and rear sides of the hinge accommodating section 231 and the lock accommodating section 232. When seen in a cross-sectional view of FIG. 14, a connecting section 233 extends to be inclined to be located downward as it goes rearward.

The cord accommodating main body 234 includes wall sections located on the front, rear, left, right and bottom sections of the cord accommodating section 230. Hereinafter, in the cord accommodating section 230, a wall section disposed on a front side is referred to as a "front wall section 234a," a wall section disposed on a rear side is referred to as a "rear wall section 234b," a wall section disposed on a left side is referred to as a "left wall section 234cL," a wall section disposed on a right side is referred to as a "right wall section 234cR," and a wall section disposed on a bottom section is referred to as an "accommodating bottom section 234d."

When seen in a cross-sectional view of FIG. 14, the front wall section 234a includes a front wall upper coupling section 234a1 coupled to a front lower end of the hinge lower wall 231b, a front wall upper half section 234a2 continuous with a lower end of the front wall upper coupling section 234a1 and extending linearly downward, a front wall intermediate section 234a3 continuous with a lower end of the front wall upper half section 234a2 and extending to be curved forward and downward, and a front wall intermediate section 234a4 continuous with a lower end of the front wall intermediate section 234a3 and extending linearly downward.

When seen in a cross-sectional view of FIG. 14, the rear wall section 234b includes a rear wall upper half section 234b1 continuous with a rear lower end of the lock lower wall 232a and extending to be inclined to be located downward as it goes forward, a rear wall intermediate section 234b2 continuous with a lower end of the rear wall upper half section 234b1 and extending to be bent forward and upward, and a rear wall lower half section 234b3 continuous with a front end of the rear wall intermediate section 234b2 and extending linearly to be inclined to be located downward as it goes forward.

The left and right wall sections 234cL and 234cR cross between front and rear sides of left and right ends of the front and rear wall sections 234a and 234b. When seen in a cross-sectional view of FIG. 15, the left and right wall sections 234cL and 234cR include left and right coupling sections 234c1 continuous with the front wall upper coupling section 234a1 (see FIG. 14) and coupled to lower ends of the left and right connecting sections 233L and 233R, and left and right wall main bodies 234c2 continuous with inner ends of the left and right coupling sections 234c1 in the vehicle width direction and extending linearly to be inclined to be located inward in the vehicle width direction as it goes downward.

The accommodating bottom section 234d crosses between front and rear sides of lower ends of the front and rear wall sections 234a and 234b (see FIG. 14) and between lower ends of the left and right wall sections 234cL and 234cR in the vehicle width direction. When seen in a cross-sectional view of FIG. 15, the accommodating bottom section 234d includes a bottom section main body 234d1 extending linearly to be inclined to be located downward as it goes leftward, and a downward protrusion 234d2 continuous with a left end of the bottom section main body 234d1 and protruding downward.

When seen in a cross-sectional view of FIG. 14, the bottom section main body 234d1 extends linearly to be inclined and located downward as it goes forward. The accommodating bottom section 234d is formed most deeply on the side of the inclined surface upper section CS1.

Figure 15:
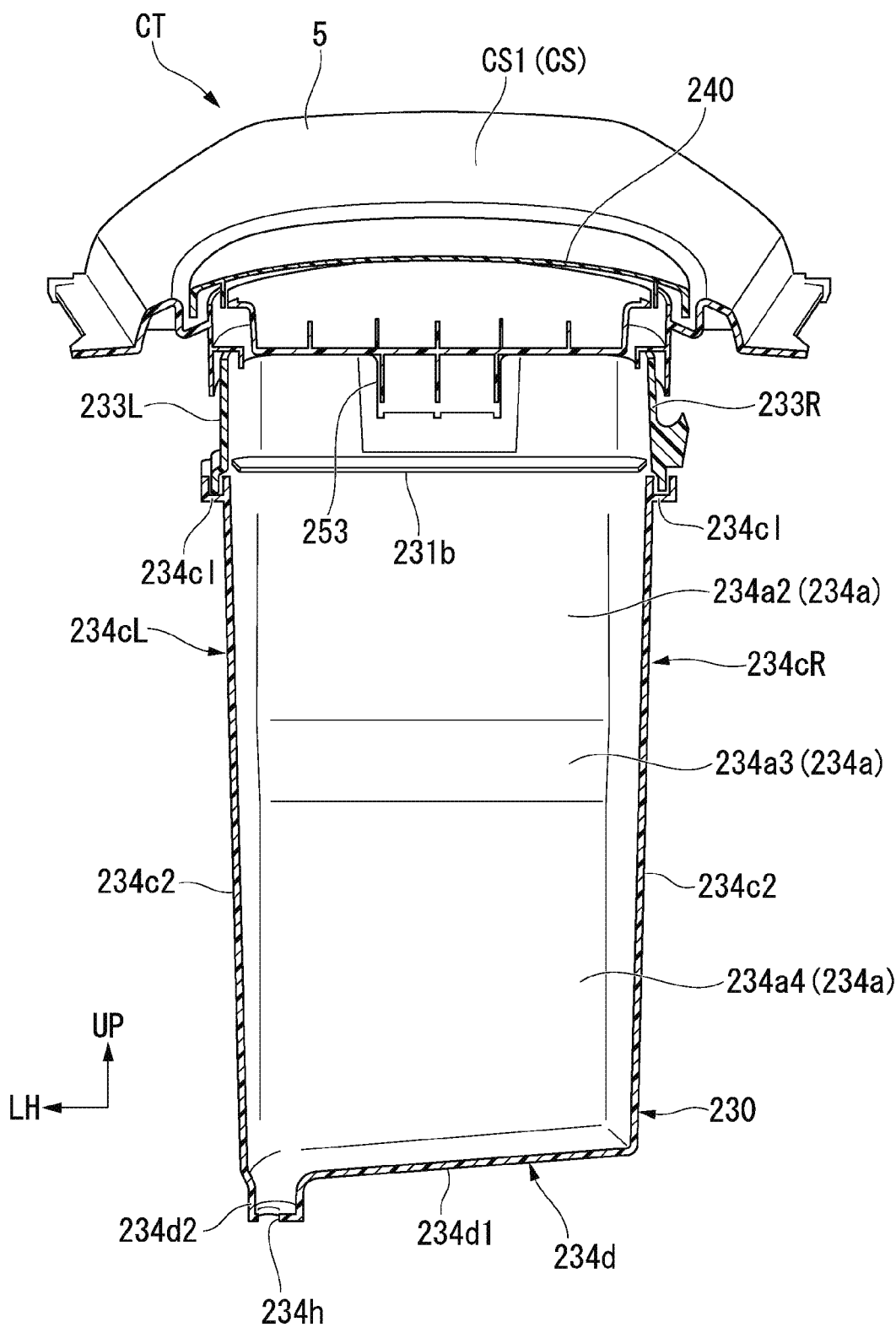
FIG. 15 is a view including a cross section along line XV-XV in FIG. 14.

As shown in FIG. 15, a drain hole 234h that opens upward and downward is formed in the lower end of the downward protrusion 234d2.

<Plug Fixing Section>

As shown in FIG. 14, a plug fixing section 235 configured to fix the connecting plug 246 (see FIG. 18) is provided on the cord accommodating section 230. The plug fixing section 235 is disposed in the vicinity of the inclined surface lower section CS2. The plug fixing section 235 is provided to protrude forward and downward from the rear wall intermediate section 234b2. For example, an insertion hole 235h configured to enable insertion of the connecting plug 246 from above is formed in the plug fixing section 235.

<Cord Drawing Section>

As shown in FIG. 14, the cord drawing section 236 configured to draw the charging cord 245 into the cord accommodating section 230 is provided on the cord accommodating section 230. The cord drawing section 236 is a hole that opens the left wall section 234cL of the cord accommodating section 230 in the vehicle width direction.

When seen in a cross-sectional view of FIG. 14, the cord drawing section 236 is formed in a rectangular shape having an upper side inclined linearly to be located downward as it goes rearward. A length of each side of the cord drawing section 236 is larger than a diameter of the charging cord 245. In the upward/downward direction, the cord drawing section 236 overlaps the rear lower section 242 of the lid 240. An upper end 236u of the cord drawing section 236 is located above the plug fixing section 235. The cord drawing section 236 is disposed above a lower end 243e of the lid 240.

An accommodating space 230s of the cord accommodating section 230 is widened on the lowermost side below the cord drawing section 236. The accommodating space 230s can accommodate the charging cord 245 drawn from the cord drawing section 236 from the vicinity of the upper section of the inclined surface upper section CS1 to the lower section of the cord accommodating section 230.

<Control System>

Figure 20:
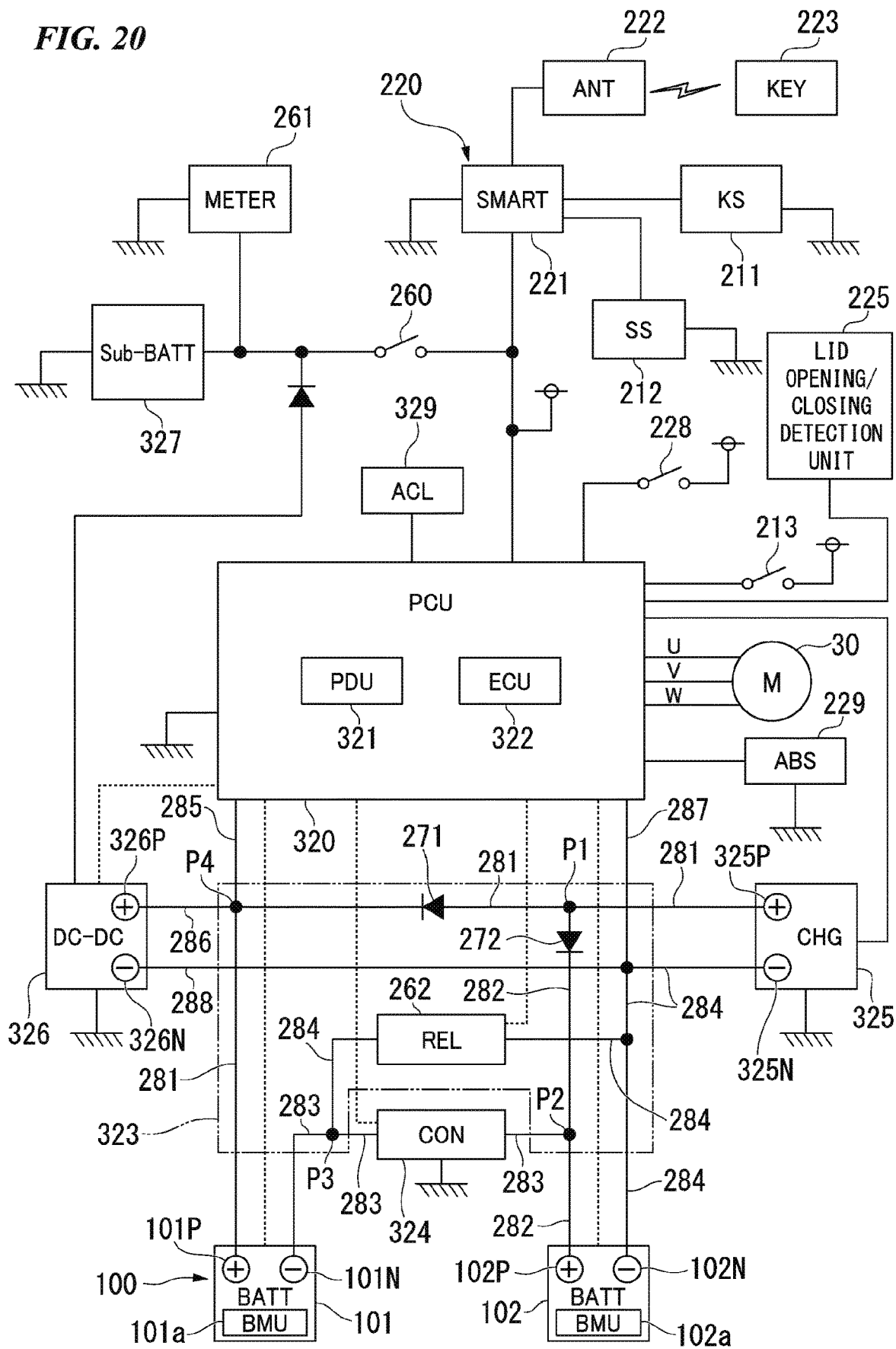
FIG. 20 is a block diagram showing a control system of a motorcycle according to the embodiment.

As shown in FIG. 20, a power driver unit (PDU) 321 and an electric control unit (ECU) 322 constitute the PCU 320 that is an integrated control unit.

Electric power from the battery 100 is supplied to the PDU 321 that is a motor driver via a contactor 324 interlocked with a main switch 260. Electric power from the battery 100 is converted into 3-phase alternating current from direct current in the PDU 321, and then, supplied to the motor 30 that is a 3-phase alternating current motor.

An output voltage from the battery 100 is stepped down via a DC-DC converter 326, and charged to a subsidiary battery 327 having a rated value of 12 V. The subsidiary battery 327 supplies electric power to general electrical components such as a lighting device and the like, and control system parts such as a meter 261, a smart unit 221, the ECU 322, and the like. Various electromagnetic locks or the like can be operated upon removal of the battery 100 (hereinafter, also referred to as "the main battery 100") by mounting the subsidiary battery 327.

Since the subsidiary battery 327 is charged via the DC-DC converter 326 in a state in which the main battery 100 is connected, the subsidiary battery 327 is charged by traveling the vehicle to which the main battery 100 is attached. Accordingly, general electrical components, control system parts, and the like, can be prevented from being inoperable due to electric reduction of the subsidiary battery 327.

While not shown, the PDU 321 includes an inverter provided with a bridge circuit, a smoothing capacitor, and the like, using a plurality of switching elements such as a transistor or the like. The PDU 321 controls electrical conduction to the stator winding of the motor 30. The motor 30 performs power running and causes the vehicle to travel according to control by the PDU 321.

The battery 100 is charged by the charger 325 connected to an external power supply while being mounted on the vehicle body. The battery 100 (the front and rear batteries 101 and 102) can also be charged by a charger outside the vehicle while being removed from the vehicle body.

Each of the front and rear batteries 101 and 102 includes battery managing units (BMUs) 101a and 102a configured to monitor a charge/discharge status, a temperature, or the like. Information monitored by the BMUs 101a and 102a is shared by the ECU 322 when the front and rear batteries 101 and 102 are mounted on the vehicle body. Output requirement information from an accelerator sensor 329 is input to the ECU 322. The ECU 322 controls to drive the motor 30 via the PDU 321 on the basis of the output requirement information that was input.

For example, the ECU 322 controls charge and discharge of the battery 100 by controlling the battery 100. For example, the ECU 322 switches between supply of electric power to the battery 100 and discharge from the battery 100 by controlling the contactor 324 and a relay 262.

A first diode 271 rectifies current flowing between a high potential-side terminal 325P of the charger 325 and a high potential-side terminal 101P of the front battery 101. For example, the first diode 271 causes current to flow in a direction from the high potential-side terminal 325P of the charger 325 toward the high potential-side terminal 101P of the front battery 101.

A second diode 272 rectifies current flowing between the high potential-side terminal 325P of the charger 325 and a high potential-side terminal 102P of the rear battery 102. For example, the second diode 272 causes current to flow in a direction from the high potential-side terminal 325P of the charger 325 toward the high potential-side terminal 102P of the rear battery 102.

The current flowing through the first diode 271 is different from the current flowing through the second diode 272. Polarities of the high potential-side terminal 325P of the charger 325, the high potential-side terminal 101P of the front battery 101 and the high potential-side terminal 102P of the rear battery 102 are the same polarity. For example, polarities of the high potential-side terminal 325P of the charger 325, the high potential-side terminal 101P of the front battery 101 and the high potential-side terminal 102P of the rear battery 102 are positive.

The first diode 271 corresponding to the front battery 101 and the second diode 272 corresponding to the rear battery 102 are provided to protect respective parts from the following phenomena.

When the first diode 271 and the second diode 272 are provided, current is prevented from flowing backward to the high potential-side terminal 325P of the charger 325 from the high potential-side terminal 101P of the front battery 101 and the high potential-side terminal 102P of the rear battery 102.

When the first diode 271 is provided, when the batteries 100 are connected in series, the front battery 101 is prevented from being short-circuited.

In a conductor 281 and a conductor 282 that connect the high potential-side terminal 101P of the front battery 101 and the high potential-side terminal 102P of the rear battery 102, since the first diode 271 and the second diode 272 are provided in opposite directions, when one of the front battery 101 and the rear battery 102 is short-circuited and malfunctioned, short circuit of the other is prevented.

The contactor 324 intermits connection between a low potential-side terminal 101N of the front battery 101 and the high potential-side terminal 101P of the rear battery 102. For example, the contactor 324 connects the low potential-side terminal 101N of the front battery 101 and the high potential-side terminal 102P of the rear battery 102 in a connection state. The contactor 324 connects the batteries 100 in series in the connection state, and disconnects the serial connection of the batteries 100 in the disconnection state. A period in which the contactor 324 is in the disconnection state includes a period in which at least the charger 325 supplies electric power to the battery 100.

The relay 262 intermits connection between the low potential-side terminal 101N of the front battery 101 and a low potential-side terminal 102N of the rear battery 102. For example, the relay 262 connects the low potential-side terminal 101N of the front battery 101 and the low potential-side terminal 102N of the rear battery 102 in the connection state. A period in which the relay 262 is in a connection state includes a period in which at least the charger 325 supplies electric power to the battery 100.

Both ends of the battery 100 connected in series are connected to the PDU 321. The front battery 101 and the rear battery 102 in the battery 100 are connected in series or in parallel by switching of states of the contactor 324 and the relay 262. The contactor 324, the relay 262, the first diode 271 and the second diode 272 are examples of a connection switching means. The diodes 271 and 272, the relay 262, and the connecting section (junction points P1 to P4) are included in a junction box 323.

<Example of Connecting Configuration of Driving System of Electric Circuit>

Parts of the driving system of the electric circuit are electrically connected by a conductor (a conductive wire) including a first conductor 281, a second conductor 282, a third conductor 283, a fourth conductor 284, a fifth conductor 285, a sixth conductor 286, a seventh conductor 287 and an eighth conductor 288 as follows.

The high potential-side terminal 101P of the front battery 101 and the high potential-side terminal 325P of the charger 325 are electrically connected by the first conductor 281. The first diode 271 is interposed in the first conductor 281. For example, a cathode of the first diode 271 is connected to the high potential-side terminal 101P of the front battery 101, and an anode of the first diode 271 is connected to the high potential-side terminal 325P of the charger 325. A first junction point P1 is provided from the anode of the first diode 271 to the high potential-side terminal 325P of the charger 325.

The first junction point P1 and the high potential-side terminal 102P of the rear battery 102 are electrically connected by the second conductor 282. The second diode 272 is interposed in the second conductor 282. For example, the cathode of the second diode 272 is connected to the high potential-side terminal 102P of the rear battery 102, and the anode of the second diode 272 is connected to the high potential-side terminal 325P of the charger 325 via the first junction point P1. A second junction point P2 is provided from the cathode of the second diode 272 to the high potential-side terminal 102P of the rear battery 102.

The second junction point P2 and the low potential-side terminal 101N of the front battery 101 are electrically connected by the third conductor 283. A contact of the contactor 324 is interposed in the third conductor 283. A third junction point P3 is provided on the third conductor 283. A position of the third junction point P3 is disposed from the contactor 324 to the low potential-side terminal 101N of the front battery 101.

The third junction point P3 and a low potential-side terminal 325N of the charger 325 are electrically connected by the fourth conductor 284. A contact of the relay 262 is interposed in the fourth conductor 284.

The low potential-side terminal (102N) of the battery (the rear battery 102) on a lower potential side in the batteries connected in series is electrically connected to the low potential-side terminal 325N of the charger 325 by the fourth conductor 284.

A fourth junction point P4 is provided from the cathode of the first diode 271 to the high potential-side terminal 101P of the front battery 101.

The fourth junction point P4 and the high potential-side terminal of the PDU 321 are electrically connected by the fifth conductor 285.

The fourth junction point P4 and a high potential-side terminal 326P of the DC-DC converter 326 are electrically connected by the sixth conductor 286.

The low potential-side terminal of the PDU 321 is connected to the low potential-side terminal 325N of the charger 325 by the seventh conductor 287.

A low potential-side terminal 326N of the DC-DC converter 326 is connected to the low potential-side terminal 325N of the charger 325 by the eighth conductor 288.

The electric circuit may include connection of a monitoring control system shown by a broken line in the drawing, in addition to connection of the driving system. The electric circuit may include the ECU 322.

<Action of Electric Circuit>

The ECU 322 acquires a state of the battery 100 from the BMUs 101a and 102a. The ECU 322 detects an operation of a user from the accelerator sensor 329 or the like. The ECU 322 controls the contactor 324, the relay 262 and the PDU 321 on the basis of the collected information.

For example, when the battery 100 is charged with electric power from the charger 325, the ECU 322 sets the contactor 324 to a disconnection state and sets the relay 262 to a connection state. When the front battery 101 and the rear battery 102 are in a parallelly connected state, electric power from the charger 325 is supplied to the front battery 101 and the rear battery 102. In the case of the control state, electric power from the charger 325 can be supplied to the PDU 321. A voltage from the charger 325 to the PDU 321 is equal to a voltage applied between the terminals of the front battery 101.

For example, when the electric power accumulated in the battery 100 drives the PDU 321, the ECU 322 sets the contactor 324 to a connection state and sets the relay 262 to a disconnection state. When the front battery 101 and the rear battery 102 are connected in series, the front battery 101 and the rear battery 102 supply electric power to the PDU 321. In the above-mentioned case, the first diode 271 is biased reversely. A voltage (for example, 96 V) of the high potential-side terminal 101P of the front battery 101 is not applied to the high potential-side terminal 102P of the rear battery 102 and the high potential-side terminal 325P of the charger 325 by the reversed bias.

<ABS>

An anti-lock brake system (ABS) 229 is electrically connected to the PCU 320. The ABS 229 has a function of automatically repeating release and operating of a brake until the brake is applied when a driving wheel is locked upon sudden braking, recovering a grip force of a tire and securing running stability of the vehicle. The ABS 229 functions as a vehicle status detecting unit configured to detect a traveling state and a stopped state of the vehicle. For example, the ABS 229 includes a wheel speed sensor (not shown) configured to detect a wheel speed.

<Action of PCU>

The PCU 320 also functions as a control part configured to control the vehicle on the basis of detection results of the lid opening/closing detection unit 225 and the ABS 229.

The PCU 320 prohibits traveling of the vehicle when the ABS 229 detects a stopped state of the vehicle and the lid opening/closing detection unit 225 detects an open state (see FIG. 17) of the lid 240.

The PCU 320 prohibits traveling of the vehicle after the vehicle is stopped when the ABS 229 detects a traveling state of the vehicle and the lid opening/closing detection unit 225 detects an open state (see FIG. 17) of the lid 240.

Here, the stopped state of the vehicle includes not only a state in which the vehicle is completely stopped but also a state in which the vehicle is substantially stopped (a state in which the vehicle is slightly moved. For example, when a speed of the vehicle is V, the stopped state of the vehicle may include a state within a range of 0 km/h≤V≤5 km/h.

<Action as Lock Control Part of PCU>

The motorcycle includes a smart system 220 (a vehicle electronic lock) configured to lock and unlock the vehicle, the PCU 320 that is a lock control part configured to control the smart system 220, and the subsidiary battery 327 configured to supply electric power to the PCU 320.

The smart system 220 can lock and unlock the vehicle according to certification to a remote key 223 (portable equipment).

The smart system 220 includes the smart unit 221 connected to the PCU 320, an antenna 222 connected to the smart unit 221, the lock knob 211 (a handle lock section) connected to the smart unit 221, and the seat switch 212 (a lid lock section) connected to the smart unit 221.

The smart unit 221 is a control part including a microcomputer.

The antenna 222 is a transmitting/receiving antenna configured to perform communication with the remote key 223.

The lock knob 211 enables locking and unlocking of the handle 2 (see FIG. 10).

The seat switch 212 can lock and unlock the seat 8 (see FIG. 1) configured to accommodate the battery 100.

The PCU 320 enables unlocking of the vehicle in a state in which the battery 100 is removed from the vehicle. The PCU 320 controls the smart unit 221 on the basis of the certified result to the remote key 223.

As shown in FIG. 11, the lock knob 211 is disposed in the vicinity of the head pipe 12. The lock knob 211 is disposed in the switch holder 210. As shown in FIG. 12, the lock pin 214 that is manually operable is provided in the switch holder 210. The lock pin 214 is driven by an operation of the lock knob 211.

The downward extension piece 202d (an engagement section) configured to be engaged with the lock pin 214 is provided in the head pipe 12 in a locked state of the handle 2 (see FIG. 10).

As shown in FIG. 20, the remote key 223 communicates with the smart unit 221 and transmits ID information. For example, the remote key 223 includes a transmitting/receiving circuit (not shown) to which a plurality of antennae configured to enable nondirectional communication (transmitting and receiving) are connected, an EEPROM (not shown) as a storage device configured to store various types of data, and a CPU (not shown) configured to control components of the remote key 223. A power supply such as a lithium battery or the like configured to drive the remote key 223 is installed in the remote key 223.

For example, certification between the smart system 220 and the remote key 223 is performed by an operation (ON) of pushing the lock knob 211 when a user having the remote key 223 enters a certification area set to the vehicle in a state in which a transmitting/receiving circuit of the remote key 223 is in an active state. The smart system 220 is not operated when the transmitting/receiving circuit of the remote key 223 is in a stopped state.

After certification between the smart system 220 and the remote key 223 is performed, since the lock that restricts pivotal movement of the lock knob 211 is released by operating the solenoid 216 (see FIG. 12), the lock knob 211 is pivotable. The locking of the handle 2 (see FIG. 10) can be performed by operating the lock knob 211. As shown in FIG. 11, the lock pin 214 (see FIG. 12) can be engaged with the downward extension piece 202d (see FIG. 12) and the handle 2 (see FIG. 10) can be locked by turning the lock knob 211 leftward.

<Actions or the Like by Various Switches>

Actions or the like by various switches will be described with reference to FIG. 20.

For example, the smart unit 221 is powered by the subsidiary battery 327 by turning on the main switch 260.

For example, the subsidiary battery 327 is charged by the main battery 100 through the DC-DC converter 326 by turning on the main switch 260 and a start switch 228.

When the main switch 260 is turned on, regardless of existence of the main battery 100, the smart unit 221 is powered by the subsidiary battery 327. Accordingly, the smart unit 221 can be operated by the subsidiary battery 327 even when the main battery 100 is not provided.

When the main switch 260 is turned on, the smart unit 221 is charged by the main battery 100 through the DC-DC converter 326.

The PCU 320 detects a state of the lid switch 213. The PCU 320 controls the vehicle on the basis of an open and closed state of the lid 240.

For example, the PCU 320 performs control that does not generate a driving force regardless of input from the accelerator sensor 329 when the open state of the lid 240 is detected before the vehicle travels.

Accordingly, the vehicle can be prevented from starting to travel in a state in which the charging cord 245 (see FIG. 18) is not accommodated (in a state in which the lid 240 is open.

For example, the PCU 320 performs control that generates a driving force according to the accelerator sensor 329 until a vehicle speed becomes substantially 0 when the open state of the lid 240 is detected while the vehicle travels. For example, the vehicle speed can be obtained from the ABS 229 connected to the PCU 320.

The vehicle speed may be obtained from a global positioning system (GPS) or another means for detecting a vehicle speed, in addition to being obtained from the ABS 229.

For example, the PCU 320 performs control that does not generate a driving force regardless of input from the accelerator sensor 329 when the vehicle speed is substantially 0 or in a stopped state.

Accordingly, even when the lid 240 (see FIG. 18) is open during traveling, the charging cord 245 (see FIG. 18) can be accommodated after moving to a safe position and stopping.

A reporting means such as an LED indicator (not shown) or the like that varies according to an open and closed state of the lid 240 (see FIG. 18) may be provided in the meter 261. The open and closed state of the lid 240 (see FIG. 18) can be confirmed even while driving by visually recognizing the LED indicator.

As described above, in the embodiment, in the motorcycle 1 including the charging cord 245 that is connectable to an external power supply, the cord accommodating section 230 configured to accommodate the charging cord 245, and the vehicle body cover 5 in which the cord accommodating section 230 is provided, the vehicle body cover 5 includes the cover inclined surface CS inclined with respect to a ground plane, the cover inclined surface CS includes the inclined surface upper section CS1 located on an upper section of the cover inclined surface CS, and the cord drawing section 236 disposed in the vicinity of the inclined surface upper section CS1 and configured to draw the charging cord 245 into the cord accommodating section 230, and the accommodating space 230s configured to accommodate the charging cord 245 drawn from the cord drawing section 236 from the vicinity of the inclined surface upper section CS1 to a lower section of the cord accommodating section 230 are provided in the cord accommodating section 230.

According to the embodiment, it is possible to effectively use an upper area of the cord accommodating section 230 and draw the charging cord 245 by providing the cord drawing section 236 disposed in the vicinity of the inclined surface upper section CS1 and configured to draw the charging cord 245 into the cord accommodating section 230 in the cord accommodating section 230. In addition, it is possible to effectively use a space in the vicinity of the inclined surface upper section CS1 and accommodate the charging cord 245. In addition, it is possible to effectively use a lower area of the cord accommodating section 230 and draw the charging cord 245 by providing the accommodating space 230s configured to accommodate the charging cord 245 drawn from the cord drawing section 236 from the vicinity of the inclined surface upper section CS1 to the lower section of the cord accommodating section 230 in the cord accommodating section 230. In addition, it is possible to effectively use the accommodating space 230s and accommodate the charging cord 245. Accordingly, it is possible to accommodate the charging cord 245 in a limited state.

Since the lid 240 provided on the cord accommodating section 230 to be opened and closed is further provided, the cover inclined surface CS is flush and continuous with the lid when the lid 240 is in a closed state and the hinge mechanism 250 configured to open and close the lid 240 is provided in the vicinity of the inclined surface upper section CS1, the following effects are exhibited. It is possible to accommodate the charging cord 245 by effectively using a space in the vicinity of the hinge mechanism 250. Accordingly, it is possible to more effectively accommodate the charging cord 245 in a limited space.

Since the cover inclined surface CS includes the inclined surface lower section CS2 located below the inclined surface upper section CS1, the connecting plug 246 that is connectable to the external power supply is provided on the charging cord 245, the plug fixing section 235 configured to fix the connecting plug 246 is provided in the cord accommodating section 230, the plug fixing section 235 is disposed in the vicinity of the inclined surface lower section CS2, and the lock mechanism 255 configured to lock the lid 240 is provided in the vicinity of the inclined surface lower section CS2, the following effects are exhibited. Since the plug fixing section 235 and the lock mechanism 255 are concentrated in the vicinity of the inclined surface lower section CS2, the lid 240 can be smoothly locked to the lock mechanism 255 after fixing the connecting plug 246 to the plug fixing section 235.

Since the cord drawing section 236 is disposed above the plug fixing section 235, the following effects are exhibited. In comparison with the case in which the cord drawing section 236 is disposed below the plug fixing section 235, after the charging cord 245 is accommodated in the cord accommodating section 230, the connecting plug 246 is easily fixed to the plug fixing section 235. In addition, when the connecting plug 246 is fixed to the plug fixing section 235, the accommodating space for the charging cord 245 is easily fitted into the space below the cord drawing section 236. Accordingly, it is possible to more effectively accommodate the charging cord 245 in a limited space.

Since the upper end 236u of the cord drawing section 236 is located above the lower end 243e of the lid 240, the following effects are exhibited. In comparison with the case in which the upper end 236u of the cord drawing section 236 is disposed below the lower end 243e of the lid 240, since it is easy to access the cord drawing section 236 from the opening of the lid 240, the charging cord 245 is easily drawn into the cord accommodating section 230.

Since the cord accommodating section 230 includes the accommodating bottom section 234d located on the bottom section of the cord accommodating section 230 and the accommodating bottom section 234d is formed most deeply on the side of the inclined surface upper section CS1, the following effects are exhibited. Since the accommodating area below the cord drawing section 236 is mostly widened vertically, the charging cord 245 is easily drawn downward from the cord drawing section 236.

Since the center tunnel CT bulging above the step floor 9 on which feet of an occupant are placed is provided in front of the front end of the seat 8 and below the handle 2 and the cover inclined surface CS is disposed on the center tunnel CT, the following effects are exhibited. It is possible to effectively use an internal area of the center tunnel CT and accommodate the charging cord 245.

While the battery disposition structure including two unit batteries has been described as exemplary example of the embodiment, there is no limitation thereto. For example, the battery disposition structure may include one or three or more unit batteries.

While a cantilever structure in which only a left side portion of the fender is fixed to the fender stay has been described as an exemplary example of the embodiment, there is no limitation thereto. For example, a cantilever structure in which only a right side portion of the fender is fixed may be provided. Alternatively, a double-sides structure in which both of left and right side portions of the fender are fixed may be provided.

The present invention is not limited to the embodiment, all vehicles on which a driver rides on the vehicle body are included as the saddle type electric vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) or a four-wheeled vehicle may also be included.

Then, the configuration in the embodiment is an example of the present invention, and various modifications, for example, substitution or the like of the components of the embodiment with known components, may be made without departing from the spirit of the present invention.

BRIEF DESCRIPTION OF THE REFERENCE SYMBOLS

1 Motorcycle (saddle type electric vehicle)
2 Handle
5 Vehicle body cover
8 Seat
9 Step floor
230 Cord accommodating section
230s Accommodating space
234d Accommodating bottom section
235 Plug fixing section
236 Cord drawing section
236u Upper end of cord drawing section
240 Lid
243e Lower end of lid
245 Charging cord
246 Connecting plug
250 Hinge mechanism
255 Lock mechanism CS Cover inclined surface
CS1 Inclined surface upper section
CS2 Inclined surface lower section

What is claim is:

1. A saddle type electric vehicle comprising:
   a charging cord that is connectable to an external power supply;
   a cord accommodating section configured to accommodate the charging cord; and
   a vehicle body cover on which the cord accommodating section is provided,
   wherein the vehicle body cover includes a cover inclined surface inclined with respect to a ground plane,
   the cover inclined surface includes an inclined surface upper section located at an upper section of the cover inclined surface,
   in the cord accommodating section,
   a cord drawing section disposed in the vicinity of the inclined surface upper section and configured to draw the charging cord into the cord accommodating section, and
   an accommodating space configured to accommodate the charging cord drawn in from the cord drawing section from the vicinity of the inclined surface upper section to a lower section of the cord accommodating section are provided,
   a center tunnel bulging above a step floor on which feet of an occupant are placed is provided in front of a front end of a seat and below a handle, and
   the cover inclined surface is disposed on the center tunnel.

2. The saddle type electric vehicle according to claim 1, further comprising a lid provided on the cord accommodating section to be opened and closed,
   wherein the cover inclined surface is flush and continuous with the lid when the lid is in a closed state, and
   a hinge mechanism configured to open and close the lid is provided in the vicinity of the inclined surface upper section.

3. The saddle type electric vehicle according to claim 1, wherein the cover inclined surface comprises an inclined surface lower section located below the inclined surface upper section,
   a connecting plug that is connectable to an external power supply is provided on the charging cord,
   a plug fixing section configured to fix the connecting plug is provided on the cord accommodating section,
   the plug fixing section is disposed in the vicinity of the inclined surface lower section, and
   a lock mechanism configured to lock the lid is provided in the vicinity of the inclined surface lower section.

4. The saddle type electric vehicle according to claim 3, wherein the cord drawing section is disposed above the plug fixing section.

5. The saddle type electric vehicle according to claim 1, wherein an upper end of the cord drawing section is located above a lower end of the lid.

6. The saddle type electric vehicle according to claim 1, wherein the cord accommodating section comprises an accommodating bottom section located on a bottom section of the cord accommodating section, and
   the accommodating bottom section is formed most deeply on a side of the inclined surface upper section.

* * * * *